(12) United States Patent
Sugimoto

(10) Patent No.: US 12,059,996 B2
(45) Date of Patent: Aug. 13, 2024

(54) VEHICLE HEADLIGHT

(71) Applicant: KOITO MANUFACTURING CO., LTD., Tokyo (JP)

(72) Inventor: Atsushi Sugimoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 86 days.

(21) Appl. No.: 17/915,241

(22) PCT Filed: Mar. 26, 2021

(86) PCT No.: PCT/JP2021/013009
§ 371 (c)(1),
(2) Date: Sep. 28, 2022

(87) PCT Pub. No.: WO2021/200701
PCT Pub. Date: Oct. 7, 2021

(65) Prior Publication Data
US 2023/0142677 A1    May 11, 2023

(30) Foreign Application Priority Data

Mar. 31, 2020 (JP) .................. 2020-065000
Apr. 7, 2020 (JP) .................. 2020-069320

(51) Int. Cl.
B60Q 1/14 (2006.01)
(52) U.S. Cl.
CPC ......... B60Q 1/1407 (2013.01); B60Q 1/1415 (2013.01); *B60Q 2300/05* (2013.01)
(58) Field of Classification Search
CPC ............... B60Q 1/1407; B60Q 1/1415; B60Q 2300/05; B60Q 2300/054;
(Continued)

(56) References Cited

U.S. PATENT DOCUMENTS

2011/0235349 A1  9/2011 Nakaya et al.
2015/0009693 A1  1/2015 Sekiguchi et al.
(Continued)

FOREIGN PATENT DOCUMENTS

DE  10 2016 210 645 A1  12/2017
EP       2 036 770 A2   3/2009
(Continued)

OTHER PUBLICATIONS

Translation of JP 2019206253 A (Year: 2019).*
(Continued)

*Primary Examiner* — Renan Luque
(74) *Attorney, Agent, or Firm* — Sughrue Mion, PLLC

(57) ABSTRACT

A vehicle headlight (1) includes a first lamp unit (10), a second lamp unit (20), a region determination unit (55), and a control unit (CO). A first irradiation spot (S1*f*) overlaps with a second irradiation spot (S2). The control unit (CO) controls the first lamp unit (10) so that an amount of the light of a light emitting element (13*f*) corresponding to the first irradiation spot (S1*f*) overlapping with a predetermined region (80) is reduced, and controls the second lamp unit (20) so that an amount of the light of a light emitting element (23) corresponding to the second irradiation spot (S2) overlapping with the predetermined region (80) is reduced or becomes 0, and light is emitted from the light emitting element (23) corresponding to the second irradiation spot (S2) overlapping with the first irradiation spot (S1*f*) and not overlapping with the predetermined region (80).

14 Claims, 14 Drawing Sheets

(58) Field of Classification Search
CPC .......... B60Q 2300/056; B60Q 2300/41; B60Q 2300/42; B60Q 1/143; F21S 41/143; F21S 41/151; F21S 41/153; F21S 41/255; F21S 41/663
See application file for complete search history.

(56) References Cited

U.S. PATENT DOCUMENTS

2016/0200238 A1    7/2016   Mochizuki
2017/0282786 A1   10/2017   Toda et al.

FOREIGN PATENT DOCUMENTS

| EP | 2 275 305 A | 1/2011 |
|---|---|---|
| EP | 2 821 282 A2 | 1/2015 |
| EP | 3 028 897 A1 | 6/2016 |
| EP | 3 401 163 A1 | 11/2018 |
| EP | 3 459 790 A1 | 3/2019 |
| FR | 3 079 470 A1 | 10/2019 |
| JP | 2011-201400 A | 10/2011 |
| JP | 2014-054892 A | 3/2014 |
| JP | 2015-015104 A | 1/2015 |
| JP | 2015-016773 A | 1/2015 |
| JP | 2016-130109 A | 7/2016 |
| JP | 2019-206253 A | 12/2019 |
| JP | 2019206253 A * 12/2019 .............. E02F 3/432 |  |
| WO | 2019/073994 A1 | 4/2019 |
| WO | 2019/172148 A1 | 9/2019 |

OTHER PUBLICATIONS

European Search Report issued Sep. 1, 2023 in Application No. 21780015.0.
Extended European Search Report issued Nov. 17, 2023 in European Application No. 21780015.0.
International Search Report of PCT/JP2021/013009 dated Jun. 1, 2021 [PCT/ISA/210].

* cited by examiner

VEHICLE HEADLIGHT

CROSS REFERENCE TO RELATED APPLICATIONS

This application is a National Stage of International Application No. PCT/JP2021/013009, filed Mar. 26, 2021, claiming priorities to Japanese Patent Application No. 2020-065000, filed Mar. 31, 2020 and Japanese Patent Application No. 2020-069320, filed Apr. 7, 2020.

TECHNICAL FIELD

The present invention relates to a vehicle headlight.

BACKGROUND ART

Conventionally, a vehicle headlight that changes a light distribution pattern of emitted light on the basis of information from a detection device that detects another vehicle located in front of a vehicle is known. Patent Literature 1 and Patent Literature 2 below describe such vehicle headlights.

A vehicle headlight described in Patent Literature 1 below includes a lamp unit having a plurality of LEDs (Light Emitting Diodes) capable of individually changing the amount of light emitted, and a control unit, and irradiation spots irradiated with the light from the respective LEDs are arranged in a horizontal direction. The control unit controls the lamp unit to turn off the LED corresponding to the irradiation spot overlapping with another vehicle based on information from a detection device that detects another vehicle located in front of the host vehicle. With such a configuration, it is possible to suppress dazzling of an occupant of the other vehicle.

A vehicle headlight described in Patent Literature 2 below includes a lamp unit including a plurality of LEDs (Light Emitting Diodes) capable of individually changing the amount of light emitted. The vehicle headlight can be switched from a first state in which light having a predetermined light distribution pattern is emitted to a second state in which light having a light distribution pattern in which a light shielding region that is not irradiated with the light from the lamp unit in the predetermined light distribution pattern is formed is emitted. The vehicle headlight is configured such that another vehicle located in front of the vehicle and the light shielding region overlap with each other, thereby suppressing dazzling of an occupant of the other vehicle.

Patent Literature 1: JP 2015-16773 A
Patent Literature 2: JP 2015-015104 A

SUMMARY OF THE INVENTION

A vehicle headlight according to a first aspect of the present invention includes: a first lamp unit including a plurality of first light emitting units capable of individually changing an amount of light emitted, the first lamp unit emitting light from the plurality of first light emitting units such that first irradiation spots irradiated with the light from the respective first light emitting units are arranged at least in a horizontal direction; a second lamp unit including a plurality of second light emitting units capable of individually changing an amount of light emitted, the second lamp unit emitting light from the plurality of second light emitting units such that second irradiation spots irradiated with the light from the respective second light emitting units are arranged in a matrix; a region determination unit that determines, based on a signal indicating a state of another vehicle from a detection device that detects the other vehicle located in front of the vehicle, a predetermined region overlapping with a visual recognition portion for allowing a driver of the other vehicle to visually recognize the outside of the vehicle; and a control unit, wherein the second irradiation spots are smaller than the first irradiation spots, and at least one of the first irradiation spots overlaps with at least one of the second irradiation spots, when the predetermined region is not determined by the region determination unit, the control unit controls the first lamp unit such that at least light is emitted from the first lamp unit, and when the predetermined region is determined by the region determination unit, the control unit controls the first lamp unit such that an amount of light emitted from the first light emitting unit corresponding to the first irradiation spot overlapping with the predetermined region is reduced, and controls the second lamp unit such that an amount of light emitted from the second light emitting unit corresponding to the second irradiation spot overlapping with the predetermined region is reduced or becomes zero, and light is emitted from the second light emitting unit corresponding to the second irradiation spot overlapping with the predetermined region and not overlapping with the predetermined region.

Here, examples of the visual recognition portion for the driver of the other vehicle to visually recognize the outside of the vehicle include a front window in a case where the other vehicle is an oncoming vehicle, and include a side mirror, a rear-view mirror, an imaging device that images the rear of the vehicle, and the like in a case where the other vehicle is a preceding vehicle. In addition, the fact that the amount of light becomes zero includes that the amount of light is reduced to zero and the amount of light is maintained at zero.

In the vehicle headlight of the first aspect, the amount of the light emitted from the first lamp unit and irradiated on the visual recognition portion of the other vehicle is reduced or becomes zero, and the amount of the light emitted from the second lamp unit and irradiated on the visual recognition portion of the other vehicle is reduced or becomes zero. Therefore, according to the vehicle headlight of the first aspect, it is possible to suppress dazzling of an occupant of the other vehicle. Further, in the vehicle headlight of the first aspect, the second irradiation spot overlapping with the first irradiation spot in which the amount of the emitted light is reduced and not overlapping with the predetermined region is irradiated with light. Therefore, the light from the second lamp unit can be irradiated to at least a portion of a region not overlapping with the predetermined region in the first irradiation spot in which the amount of the emitted light is reduced. Therefore, according to the vehicle headlight of the first aspect, the forward visibility can be improved as compared with a case where the second lamp unit is not provided.

In the vehicle headlight according to the first aspect, when the predetermined region is determined by the region determination unit, the control unit may control the second lamp unit so that the amount of light emitted from the second light emitting unit corresponding to the second irradiation spot overlapping with the first irradiation spot overlapping with the predetermined region and not overlapping with the predetermined region increases as compared with a case where the predetermined region is not determined by the region determination unit.

With such a configuration, as compared with the case where the amount of the light does not increase, the amount of the light from the second lamp unit irradiated to at least a portion of the region not overlapping with the predetermined region in the first irradiation spot in which the amount of the emitted light is reduced can be increased, and the forward visibility can be further improved.

In the vehicle headlight according to the first aspect, at least one of the first irradiation spots may overlap with at least two of the second irradiation spots, and when the predetermined region is determined by the region determination unit, the control unit may control the second lamp unit such that the second light emitting unit corresponding to the second irradiation spot closer to the predetermined region among the second irradiation spots overlapping with the first irradiation spot overlapping with the predetermined region and not overlapping with the predetermined region emits a larger amount of light.

For example, in the case that a portion of the first irradiation spot in which the amount of the emitted light is reduced and a portion of the other first irradiation spot adjacent to the first irradiation spot overlap with each other, the overlapping region overlapping with the other first irradiation spot in the first irradiation spot in which the amount of the emitted light is reduced is irradiated with the light from the first light emitting unit corresponding to the other first irradiation spot. Here, in the irradiation spot irradiated with light, the intensity of light irradiated from the center side toward the outer edge side tends to decrease. Therefore, the intensity of the light from the first light emitting unit corresponding to another first irradiation spot irradiated to the overlapping region tends to increase toward the predetermined region. In this vehicle headlight, a second irradiation spot closer to a predetermined region among second irradiation spots overlapping with the first irradiation spot in which the amount of the emitted light is reduced and not overlapping with the predetermined region has a higher intensity of the emitted light. For this reason, for example, in a case where the second irradiation spot overlapping with the first irradiation spot in which the amount of the emitted light is reduced and not overlapping with the predetermined region overlaps with the overlapping region, the light intensity in the overlapping region can be made uniform, and the driver can be prevented from feeling uncomfortable about the overlapping region.

Alternatively, when the predetermined region is determined by the region determination unit, the control unit may control the second lamp unit such that the amount of light emitted from the second light emitting unit corresponding to the second irradiation spot overlapping with the first irradiation spot overlapping with the predetermined region and not overlapping with the predetermined region does not change from the amount of light when the predetermined region is not determined by the region determination unit.

With such a configuration, the control of the second lamp unit by the control unit can be simplified as compared with the case where the amount of the light changes.

In the vehicle headlight according to the first aspect, when the predetermined region is not determined by the region determination unit, the control unit may control the first lamp unit and the second lamp unit so that light is emitted from the first lamp unit and the second lamp unit.

With such a configuration, in a case where the predetermined region is not determined by the region determination unit, the light distribution pattern is formed by the light including light emitted from the first lamp unit and the light emitted from the second lamp unit. As described above, since at least one first irradiation spot overlaps with at least one second irradiation spot, the region irradiated with the light emitted from the first lamp unit and the region irradiated with the light emitted from the second lamp unit can overlap with each other. Therefore, according to the vehicle headlight of the first aspect, the degree of freedom of the light intensity distribution in the formed light distribution pattern can be improved as compared with the case where the light from the second lamp unit is not emitted in the above case.

A vehicle headlight according to a second aspect of the present invention includes: a lamp unit including a plurality of light emitting units capable of individually changing an amount of light emitted and arranged in a matrix, the lamp unit emitting light having a light distribution pattern corresponding to the amount of light emitted from the plurality of light emitting units, wherein the lamp unit can be switched between a first state in which light of a predetermined light distribution pattern is emitted and a second state in which light of a light distribution pattern in which a light amount of a predetermined region in the predetermined light distribution pattern is reduced is emitted, and when the state is switched from the second state to the first state, the light amount in a partial region of the predetermined region is returned to the light amount in the partial region in the first state, and the partial region expands over time.

In the vehicle headlight of the second aspect, when the predetermined region overlaps with the visual recognition portion for the driver of another vehicle to visually recognize the outside of the vehicle, switching from the first state to the second state can suppress dazzling of the occupant of the other vehicle. In addition, in the vehicle headlight of the second aspect, it is brightened from a partial region in a predetermined region, and the bright region expands over time. In other words, the region in which the light amount is reduced decreases over time. Therefore, according to the vehicle headlight of the second aspect, it is possible to suppress the driver from feeling uncomfortable about the change in brightness in the predetermined region as compared with the case of instantaneously switching from the second state to the first state.

In the vehicle headlight according to the second aspect, the partial region may expand upward from a lower edge of the predetermined region over time.

The object to which the driver pays attention includes, for example, a pedestrian, an obstacle, and the like on a road as well as other vehicles. In this vehicle headlight, when the state is switched from the second state to the first state, it can be brightened from the side close to the road in the predetermined region. Therefore, according to the vehicle headlight of the second aspect, for example, in a case where the predetermined region overlaps with a pedestrian, an obstacle, or the like on the road when the state is switched from the second state to the first state, the pedestrian, the obstacle, or the like can be recognized by the driver more quickly.

In the vehicle headlight according to the second aspect, the partial region may expand downward from an upper edge of the predetermined region over time.

Signs are located above the road. In this vehicle headlight of the second aspect, when the state is switched from the second state to the first state, it is brightened from the upper side in the predetermined region. Therefore, according to the vehicle headlight of the second aspect, for example, when the predetermined region and a sign overlap with each other at the time of switching from the second state to the first state, the sign can be recognized by the driver more quickly.

In the vehicle headlight according to the second aspect, the partial region may expand from an edge on one side in a horizontal direction of the predetermined region toward the other side over time.

In this vehicle headlight of the second aspect, it is brightened from one side in the horizontal direction of the predetermined region. Therefore, the adjustment of the light emitted from the plurality of light emitting units can be simplified as compared with the case where the light is brightened from both sides in the horizontal direction of the predetermined region. In addition, in a case where the predetermined region and a sign located on the road shoulder side overlap with each other and the partial region extends from the edge on the side where the sign is located in the horizontal direction, the sign can be recognized by the driver quickly.

In this case, a center of the predetermined region may be shifted from a center of the predetermined light distribution pattern in the horizontal direction to a predetermined side in the horizontal direction, and the partial region may expand from an edge on a side opposite to the predetermined side in the horizontal direction of the predetermined region toward the predetermined side over time.

Generally, the center in the horizontal direction in the light distribution pattern of the emitted light tends to be located on a vertical line passing through the center in the horizontal direction of the vehicle. Therefore, in this vehicle headlight of the second aspect, when switching from the second state to the first state, it can be brightened from the side closer to the vertical line passing through the center of the vehicle of both sides in the horizontal direction of the predetermined region. Therefore, according to the vehicle headlight of the second aspect, it is possible to further suppress the driver from feeling uncomfortable about the change in brightness in the predetermined region as compared with the case where it is brightened from the side farther from the vertical line passing through the center of the vehicle of both sides in the horizontal direction of the predetermined region.

In the vehicle headlight according to the second aspect, the partial region may expand from an entire circumference of an outer peripheral edge of the predetermined region toward an inner side of the predetermined region over time.

With such a configuration, the predetermined region can be brightened faster than a case where the partial region expands from a portion of the outer peripheral edge of the predetermined region. Therefore, a sign or the like overlapping with the predetermined region can be recognized by the driver more quickly. In addition, as compared with a case where a portion of the region extends from a portion of the outer peripheral edge of the predetermined region, it is possible to suppress the driver from feeling uncomfortable and to give the driver a sense of security.

The vehicle headlight according to the second aspect, the partial region may expand from an inner side of the predetermined region toward an outer peripheral side of the predetermined region over time.

In this vehicle headlight, it is brightened from the inside of the predetermined region. Therefore, according to the vehicle headlight of the second aspect, it is possible to further suppress the driver from feeling uncomfortable about the change in brightness in the predetermined region as compared with the case where it is brightened from the outer peripheral side of the predetermined region.

In this case, a speed at which the partial region expands downward may be faster than a speed at which the partial region expands upward.

In this vehicle headlight of the second aspect, when switching from the second state to the first state, the lower side in the predetermined region can be brightened faster than the upper side. Therefore, according to the vehicle headlight of the second aspect, for example, in a case where the predetermined region overlaps with a pedestrian, an obstacle, or the like on the road when the state is switched from the second state to the first state, the pedestrian, the obstacle, or the like can be recognized by the driver more quickly.

Alternatively, a speed at which the partial region expands upward may be faster than a speed at which the partial region expands downward.

In this vehicle headlight of the second aspect, when switching from the second state to the first state, the upper side in the predetermined region can be brightened faster than the lower side. Therefore, according to the vehicle headlight of the second aspect, for example, when the predetermined region and a sign overlap with each other at the time of switching from the second state to the first state, the sign can be recognized by the driver more quickly.

In the vehicle headlight according to the second aspect, when the state is switched from the second state to the first state, in a region other than the partial region in the predetermined region, a light amount may be increased over time such that an intensity of light decreases as a distance from the partial region increases.

As described above, in the vehicle headlight of the second aspect, when the state is switched from the second state to the first state, it is brightened from a partial region in the predetermined region, and the bright region expands over time. For this reason, by adopting the above configuration, it is possible to make the predetermined region darker as the distance from the bright region increases, and to make the boundary between the bright region and the dark region inconspicuous. Therefore, according to the vehicle headlight of the second aspect, it is possible to further suppress the driver from feeling uncomfortable about the change in brightness in the predetermined region.

DESCRIPTION OF EMBODIMENTS

Hereinafter, embodiments for implementing a vehicle headlight according to the present invention will be illustrated together with the accompanying drawings. The embodiments exemplified below are intended to facilitate understanding of the present invention and are not intended to limit the present invention. The present invention can be modified and improved from the following embodiments without departing from the gist thereof. In the accompanying drawings, the dimensions of each member may be exaggerated for easy understanding.

First Embodiment

Figure 1:
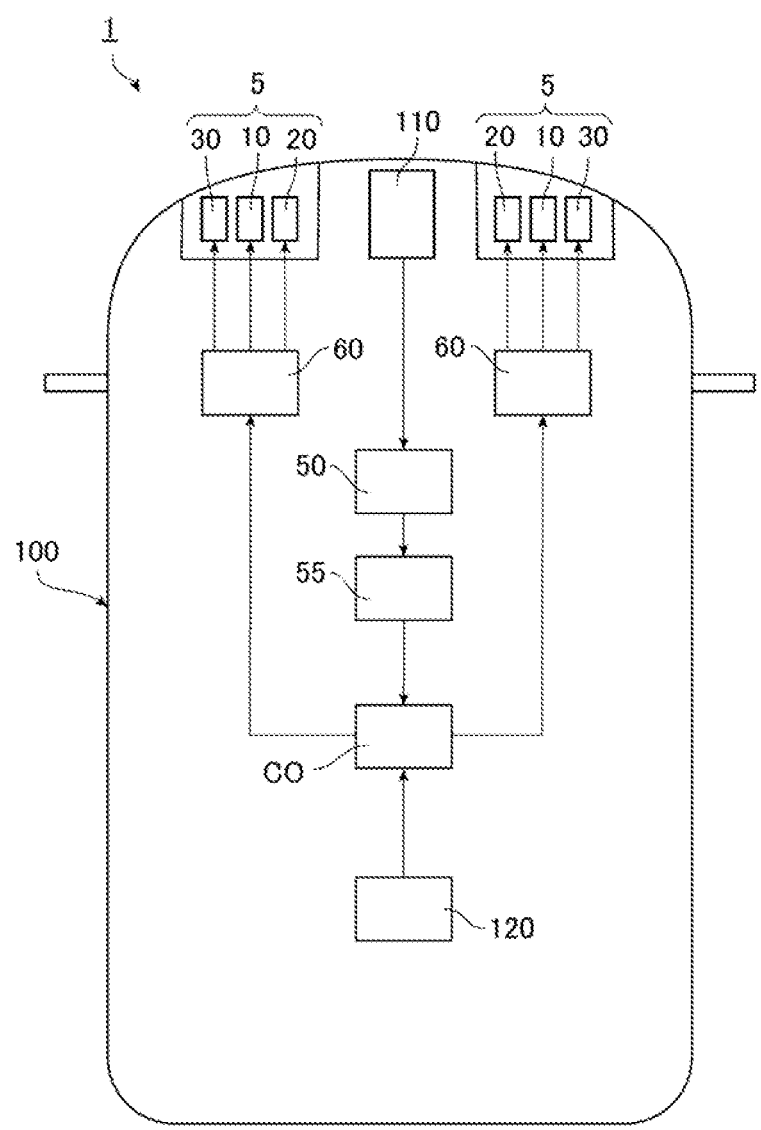
FIG. 1 is a plan view conceptually illustrating a vehicle including a vehicle headlight according to a first embodiment as a first aspect of the present invention.

A first embodiment as a first aspect of the present invention will be described. FIG. 1 is a plan view conceptually illustrating a vehicle including a vehicle headlight of the present embodiment. As illustrated in FIG. 1, a vehicle 100 includes a vehicle headlight 1, a detection device 110, and a light switch 120.

The vehicle headlight 1 of the present embodiment is a headlight for an automobile. The vehicle headlight 1 includes a pair of left and right lamp units 5, a control unit CO, a determination unit 50, a region determination unit 55, and a pair of power supply circuits 60 as main components. In the present specification, unless otherwise specified, "right" means the right side from the viewpoint of the driver of the vehicle 100 that is the host vehicle, and "left" means the left side from the viewpoint of the driver of the vehicle 100 that is the host vehicle.

In the present embodiment, the pair of lamp units 5 have substantially symmetrical shapes in the horizontal direction of the vehicle 100, and emit light of a light distribution pattern changeable toward the front of the vehicle 100. In addition, the configuration of one of the lamp units 5 is the same as the configuration of the other lamp unit 5 except that the shape is substantially symmetrical. Therefore, one of the lamp units 5 will be described below, and the description of the other lamp unit 5 will be omitted.

The lamp unit 5 of the present embodiment includes a first lamp unit 10, a second lamp unit 20, and a third lamp unit 30. These lamp units 10, 20, and 30 are arranged side by side, the second lamp unit 20 is arranged on the most center side of the vehicle 100, the third lamp unit 30 is arranged on the outermost side of the vehicle 100, and the first lamp unit 10 is arranged between the second lamp unit 20 and the third lamp unit 30.

Figure 2:
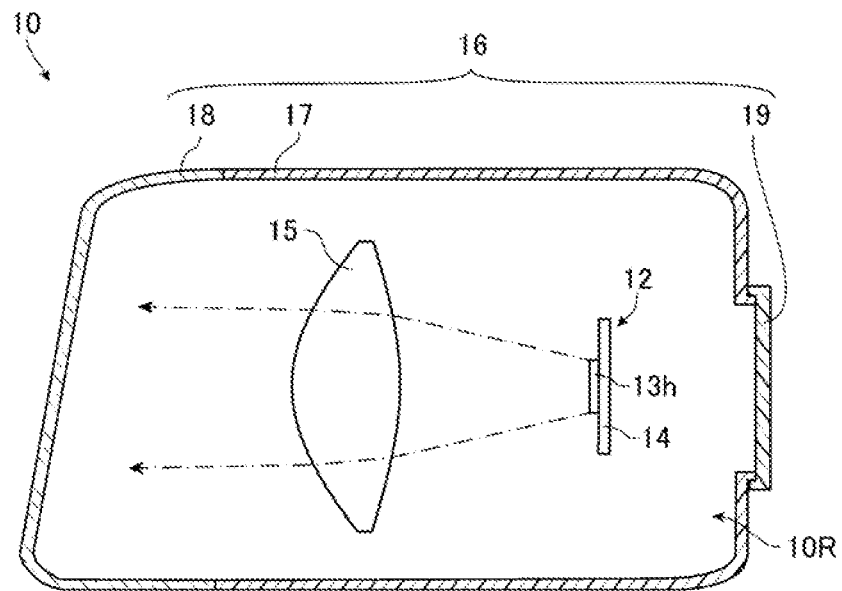
FIG. 2 is a side view schematically illustrating a first lamp unit illustrated in FIG. 1.

FIG. 2 is a side view schematically illustrating the first lamp unit 10 illustrated in FIG. 1. As illustrated in FIG. 1, the first lamp unit 10 mainly includes a light distribution pattern forming unit 12, a projection lens 15, and a housing 16. In FIG. 2, the housing 16 is illustrated in a vertical cross-section.

The housing 16 mainly includes a lamp housing 17, a front cover 18, and a back cover 19. The front of the lamp housing 17 is opened, and the front cover 18 is fixed to the lamp housing 17 so as to close the opening. An opening smaller than that in the front is formed behind the lamp housing 17, and the back cover 19 is fixed to the lamp housing 17 so as to close the opening.

A space formed by the lamp housing 17, the front cover 18 closing the front opening of the lamp housing 17, and the back cover 19 closing the rear opening of the lamp housing 17 is a lamp chamber 10R, and the light distribution pattern forming unit 12 and the projection lens 15 are accommodated in the lamp chamber 10R.

Figure 3:
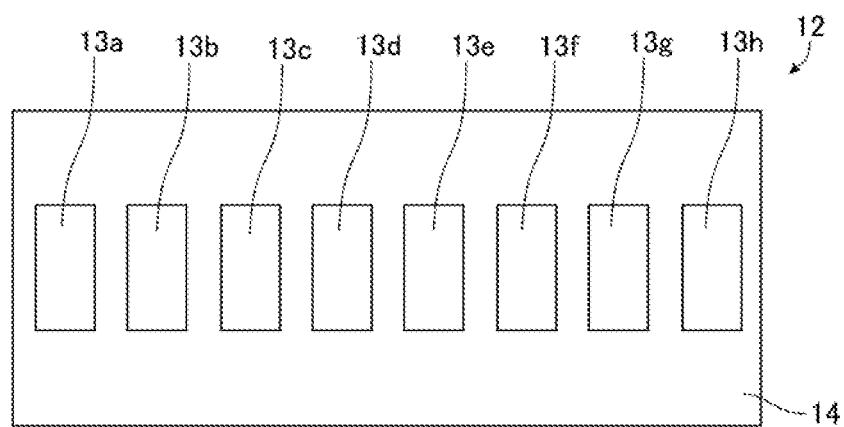
FIG. 3 is a front view schematically illustrating a light distribution pattern forming unit illustrated in FIG. 2.

FIG. 3 is a front view schematically illustrating the light distribution pattern forming unit 12 illustrated in FIG. 2. As illustrated in FIGS. 2 and 3, the light distribution pattern forming unit 12 of the present embodiment includes a plurality of light emitting elements 13a to 13h as first light emitting units that emit light, and a circuit board 14 on which the plurality of light emitting elements 13a to 13h is mounted. The plurality of light emitting elements 13a to 13h are arranged in a line in the horizontal direction, and emit light forward. The plurality of light emitting elements 13a to 13h can individually change the amount of emitted light. In the present embodiment, the light emitting elements 13a to 13h are substantially rectangular LEDs whose light emission surfaces are elongated in the vertical direction, and the light distribution pattern forming unit 12 is a so-called LED array, and eight LEDs are arranged. Note that the type and number of light emitting elements are not particularly limited.

Such a light distribution pattern forming unit 12 can form a predetermined light distribution pattern by selecting the light emitting elements 13a to 13h that emit light. In addition, the light distribution pattern forming unit 12 can adjust the light intensity distribution in a predetermined light distribution pattern by adjusting the amount of light emitted from each of the light emitting elements 13a to 13h. That is, it can be understood that the light distribution pattern forming unit 12 forms a predetermined light distribution pattern according to the amount of light emitted from the plurality of light emitting elements 13a to 13h.

The projection lens 15 is a lens that adjusts a divergence angle of incident light. The projection lens 15 is disposed in front of the light distribution pattern forming unit 12, light emitted from the light distribution pattern forming unit 12 is incident thereon, and a divergence angle of the light is adjusted by the projection lens 15. The projection lens 15 is a lens in which an incident surface and an emission surface are formed in a convex shape. The optical axis of the projection lens 15 passes between the light emitting element 13*d* and the light emitting element 13*e* in the light distribution pattern forming unit 12, and the rear focal point of the projection lens 15 is located on or near the surface including the light emission surface of the light emitting element 13*d*. The light whose divergence angle is adjusted by the projection lens 15 is emitted from the first lamp unit 10 toward the front of the vehicle 100 via the front cover 18.

Figure 4:
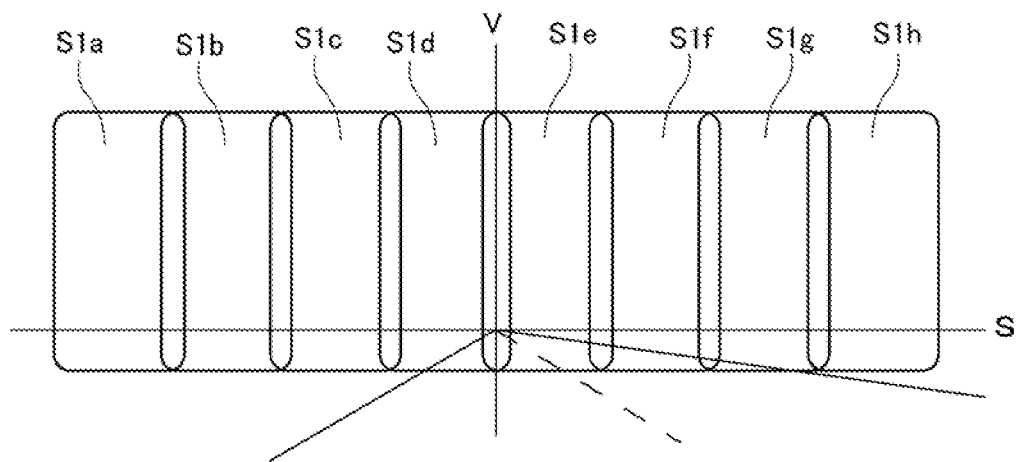
FIG. 4 is a view illustrating first irradiation spots irradiated with light from each light emitting element illustrated in FIG. 3.

FIG. 4 is a diagram illustrating first irradiation spots irradiated with the light from the light emitting elements 13*a* to 13*h* illustrated in FIG. 3. First irradiation spots S1*a* to S1*h* illustrated in FIG. 4 are regions irradiated with the light from the light emitting elements 13*a* to 13*h* on a virtual vertical screen arranged 25 meters ahead of the vehicle 100. In FIG. 4, S represents a horizontal line, and V represents a vertical line passing through the center of the vehicle 100 in the horizontal direction. As described above, because the plurality of light emitting elements 13*a* to 13*h* are arranged in line in the horizontal direction, the first irradiation spots S1*a* to S1*h* are arranged in line in the horizontal direction. Therefore, it can be understood that the first lamp unit 10 emits the light from the plurality of light emitting elements 13*a* to 13*h* such that the first irradiation spots S1*a* to S1*h* irradiated with the light from the light emitting elements 13*a* to 13*h* are aligned in the horizontal direction. The first irradiation spot S1*a* corresponds to the light emitting element 13*a*, and when light is emitted from light emitting element 13*a*, the first irradiation spot S1*a* is irradiated with the light. The first irradiation spot S1*b* corresponds to the light emitting element 13*b*, the first irradiation spot S1*c* corresponds to the light emitting element 13*c*, the first irradiation spot S1*d* corresponds to the light emitting element 13*d*, the first irradiation spot S1*e* corresponds to the light emitting element 13*e*, the first irradiation spot S1*f* corresponds to the light emitting element 13*f*, the first irradiation spot S1*g* corresponds to the light emitting element 13*g*, and the first irradiation spot S1*h* corresponds to the light emitting element 13*h*.

These first irradiation spots S1*a* to S1*h* have substantially the same size and have rectangular shapes elongated in the vertical direction. The adjacent first irradiation spots partially overlap with each other. For example, a portion of the first irradiation spot S1*a* and a portion of the first irradiation spot S1*b* overlap with each other, and another portion of the first irradiation spot S1*b* and a portion of the first irradiation spot S1*c* overlap with each other. The first irradiation spots S1*a* to S1*h* overlap with the horizontal line S, and the two first irradiation spots S1*d* and S1*e* overlap with the vertical line V. In other words, the positions and the like of the light emitting elements 13*a* to 13*h* are adjusted such that the first irradiation spots S1*a* to S1*h* are arranged in this manner. The adjacent first irradiation spots may be in contact with each other or may be separated from each other to form a gap. However, it is preferable that these first irradiation spots S1*a* to S1*h* are arranged without a gap in the horizontal direction. The shapes of the first irradiation spots S1*a* to S1*h* are not particularly limited.

Figure 5:
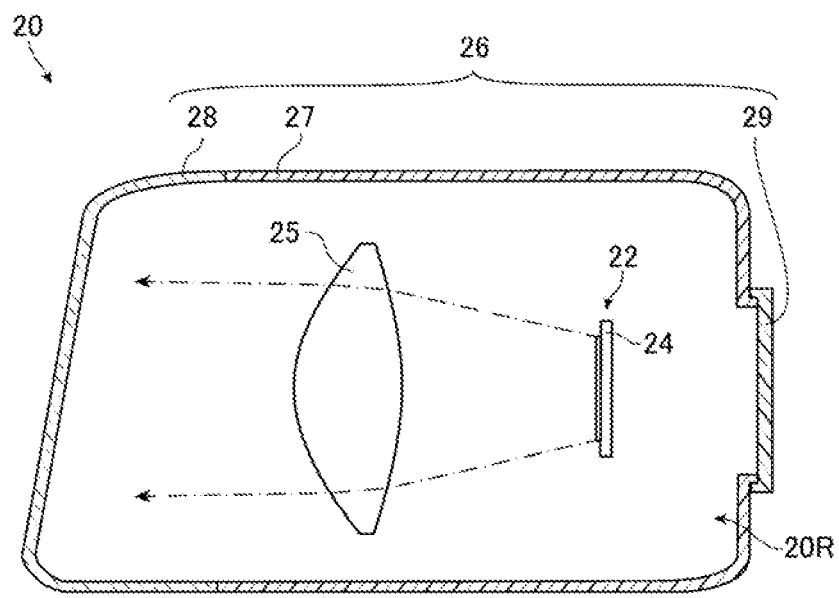
FIG. 5 is a side view schematically illustrating a second lamp unit illustrated in FIG. 1.

FIG. 5 is a side view schematically illustrating the second lamp unit 20 illustrated in FIG. 1. As illustrated in FIG. 5, the second lamp unit 20 mainly includes a light distribution pattern forming unit 22, a projection lens 25, and a housing 26. In FIG. 5, the housing 26 is illustrated in a vertical cross-section. The housing 26 has a configuration similar to that of the housing 16 of the first lamp unit 10, and mainly includes a lamp housing 27, a front cover 28, and a back cover 29, and the light distribution pattern forming unit 22 and the projection lens 25 are accommodated in a lamp chamber 20R formed by the housing 26.

Figure 6:
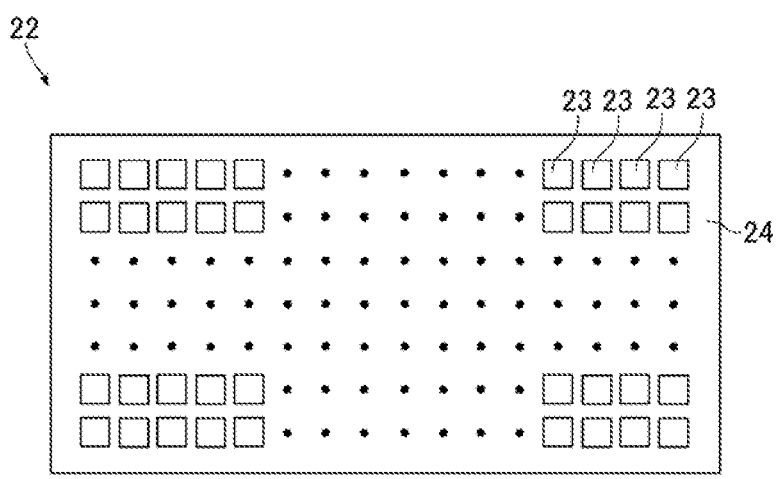
FIG. 6 is a front view schematically illustrating a light distribution pattern forming unit illustrated in FIG. 5.

FIG. 6 is a front view schematically illustrating the light distribution pattern forming unit 22 illustrated in FIG. 5. As illustrated in FIGS. 5 and 6, the light distribution pattern forming unit 22 of the present embodiment includes a plurality of light emitting elements 23 as second light emitting units that emit light, and a circuit board 24 on which the plurality of light emitting elements 23 is mounted. The plurality of light emitting elements 23 are arranged in a matrix to form rows in the vertical direction and the horizontal direction, and emit light forward. These light emitting elements 23 are smaller than the light emitting elements 13*a* to 13*h* in the first lamp unit 10, and can individually change the amount of emitted light. In the present embodiment, the light distribution pattern forming unit 22 has thirty-two light emitting element groups each including ninety-six light emitting elements 23 arranged in the horizontal direction, and these light emitting element groups are arranged in the vertical direction. In addition, these light emitting elements 23 are micro LEDs, and the light distribution pattern forming unit 22 is a so-called micro LED array. Note that the number of light emitting elements 23 in each light emitting element group and the number of light emitting element groups are not particularly limited.

Such a light distribution pattern forming unit 22 can form a predetermined light distribution pattern by selecting the light emitting elements 23 that emit light. In addition, the light distribution pattern forming unit 22 can adjust the light intensity distribution in a predetermined light distribution pattern by adjusting the amount of light emitted from each of the light emitting elements 23. That is, it can be understood that the light distribution pattern forming unit 22 forms a predetermined light distribution pattern according to the amount of light emitted from the plurality of light emitting elements 23.

Similarly to the projection lens 15, the projection lens 25 is a lens that adjusts a divergence angle of incident light. The projection lens 25 is disposed in front of the light distribution pattern forming unit 22, light emitted from the light distribution pattern forming unit 22 is incident thereon, and a divergence angle of the light is adjusted by the projection lens 25. The projection lens 25 is a lens in which the incident surface and the emission surface are formed in a convex shape, and the rear focal point of the projection lens 25 is located on or near the light emission surface of any one of the light emitting elements 23 in the light distribution pattern forming unit 22. The light whose divergence angle is adjusted by the projection lens 25 is emitted from the second lamp unit 20 toward the front of the vehicle 100 via the front cover 28.

Figure 7:
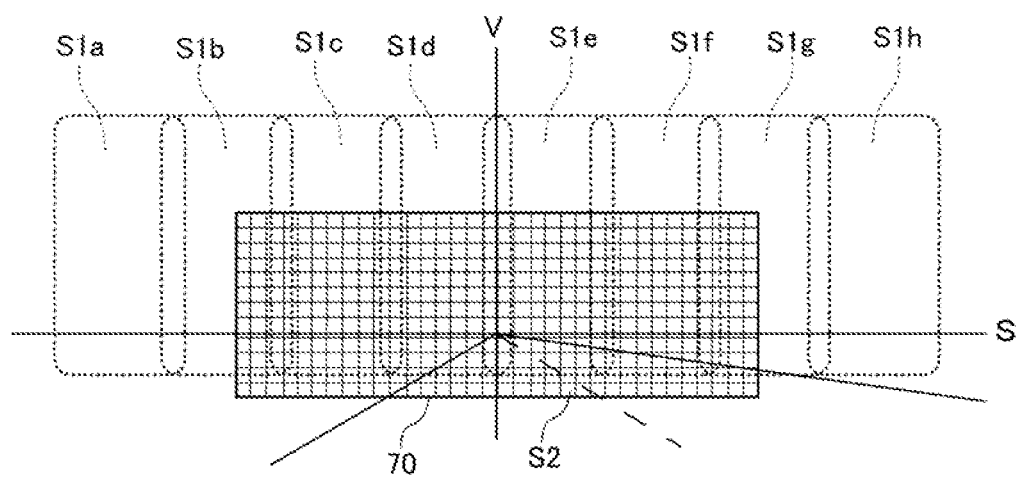
FIG. 7 is a diagram illustrating second irradiation spots irradiated with light from each light emitting element illustrated in FIG. 6.

FIG. 7 is a diagram illustrating second irradiation spots irradiated with the light from the light emitting elements 23 illustrated in FIG. 6. The second irradiation spot S2 illustrated in FIG. 7 is a region irradiated with the light from the light emitting element 23 on a virtual vertical screen arranged 25 meters ahead of the vehicle 100. In FIG. 7, S represents a horizontal line, V represents a vertical line passing through the center of the vehicle 100 in the horizontal direction, and the first irradiation spots S1*a* to S1*h* are indicated by broken lines. Since the plurality of light emitting elements 23 in the light distribution pattern forming unit 22 are arranged in a matrix as described above, the second irradiation spots S2 irradiated with the light from the respective light emitting elements 23 are arranged in a matrix in front of the vehicle 100. Therefore, it can be understood that the second lamp unit 20 emits light from the plurality of light emitting elements 23 such that the second irradiation spots S2 irradiated with the light from the respective light emitting elements 23 are arranged in a matrix. For easy understanding, the number of the plurality of second irradiation spots S2 is reduced in FIG. 7. Each second irradiation spot S2 corresponds to one light emitting element 23, and the relative position of a specific light emitting element 23 in the plurality of light emitting elements 23 and the relative position of the specific second irradiation spot S2 corresponding to the specific light emitting element 23 in the plurality of second irradiation spots S2 are reversed vertically and horizontally. For example, the second irradiation spot S2 corresponding to the light emitting element 23 located at the upper right end of the viewpoint of the driver of the vehicle 100 is located at the lower left end of the viewpoint of the driver of the vehicle 100.

These second irradiation spots S2 have square shapes of substantially the same size. In FIG. 7, for easy understanding, the plurality of second irradiation spots S2 are illustrated such that adjacent second irradiation spots S2 are in contact with each other, but adjacent second irradiation spots S2 overlap with each other. The region 70 formed by the whole second irradiation spots S2 has a rectangular shape elongated in the horizontal direction. That is, it can be understood that the region 70 is a region that can be irradiated with light from the second lamp unit 20. The region 70 overlaps with the horizontal line S and the vertical line V, and also overlaps with the six first irradiation spots S1b to S1g. Each of the six first irradiation spots S1b to S1g overlaps with at least one of the second irradiation spots S2, and in the present embodiment, overlaps with the plurality of second irradiation spots S2. In other words, the orientation and the like of the second lamp unit 20 are adjusted such that the region 70 formed by the second irradiation spots S2 is arranged in this manner. Adjacent second irradiation spots S2 may be in contact with each other or may be separated from each other to form a gap. However, it is preferable that the plurality of second irradiation spots S2 are arranged in a matrix without a gap. The shape of the second irradiation spot S2 is not particularly limited as long as the second irradiation spot S2 is smaller than the first irradiation spots S1a to S1h. The plurality of second irradiation spots S2 may include second irradiation spots S2 having different sizes and shapes. At least one first irradiation spot among the eight first irradiation spots S1a to S1h may overlap with at least one second irradiation spot S2, and all the irradiation spots S1a to S1h may overlap with the second irradiation spot S2.

Figure 8:
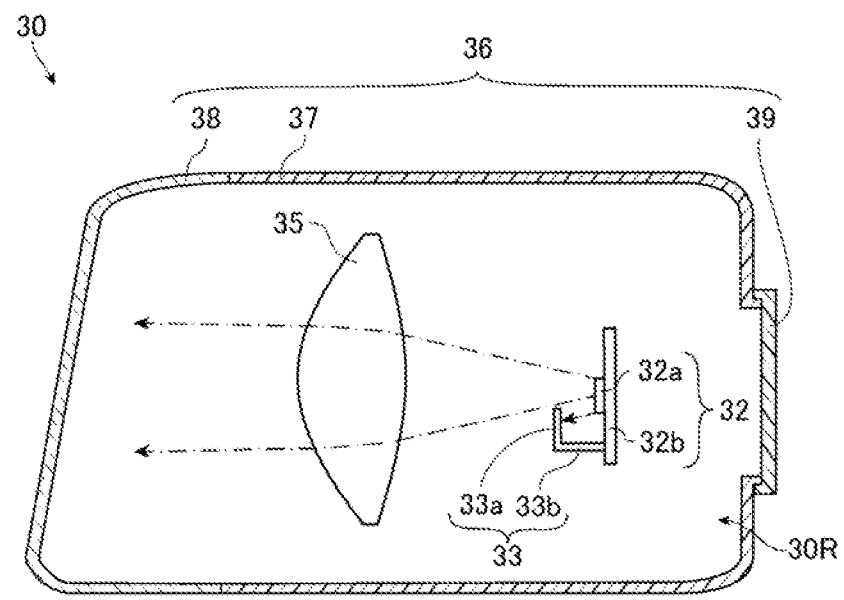
FIG. 8 is a side view schematically illustrating a third lamp unit illustrated in FIG. 1.

FIG. 8 is a side view schematically illustrating the third lamp unit 30 illustrated in FIG. 1. As illustrated in FIG. 8, the third lamp unit 30 mainly includes a light source unit 32, a shade 33, a projection lens 35, and a housing 36. In FIG. 8, the housing 36 is illustrated in a vertical cross-section. The housing 36 has a configuration similar to that of the housing 16 of the first lamp unit 10, and mainly includes a lamp housing 37, a front cover 38, and a back cover 39. The light source unit 32, the shade 33, and the projection lens 35 are accommodated in a lamp chamber 30R formed by the housing 36.

Figure 9:
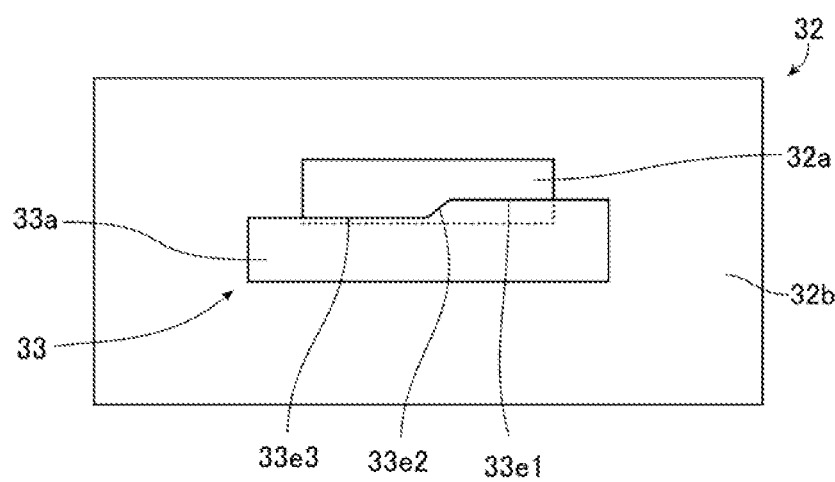
FIG. 9 is a front view schematically illustrating a light source unit illustrated in FIG. 8.

FIG. 9 is a front view schematically illustrating the light source unit 32 illustrated in FIG. 8. Note that the shade 33 is also illustrated in FIG. 9. As illustrated in FIGS. 8 and 9, the light source unit 32 of the present embodiment includes a light emitting element 32a that emits light and a circuit board 32b on which the light emitting element 32a is mounted. In the present embodiment, the light emitting element 32a is a substantially rectangular LED whose light emission surface is long in the horizontal direction, and emits light forward.

The shade 33 includes a light shielding portion 33a and a fixing portion 33b. In the present embodiment, the light shielding portion 33a and the fixing portion 33b are integrally formed by bending a plate-shaped member. The light shielding portion 33a extends in the horizontal direction in front of the light emitting element 32a of the light source unit 32, and the fixing portion 33b is connected to a lower end portion thereof. The fixing portion 33b extends rearward from a lower end portion of the light shielding portion 33a, and an end portion of the fixing portion 33b on a side opposite to the light shielding portion 33a side is fixed to the circuit board 32b. The upper edge of the light shielding portion 33a includes a first edge portion 33e1, a second edge portion 33e2, and a third edge portion 33e3. The first edge portion 33e1 extends in a substantially horizontal direction. The second edge portion 33e2 extends linearly and downward from an end on one side of the first edge portion 33e1 toward the side opposite to the first edge portion 33e1. The third edge portion 33e3 extends in the substantially horizontal direction from the end of the second edge portion 33e2 on the side opposite to the first edge portion 33e1 toward the side opposite to the first edge portion 33e1. The light shielding portion 33a of such a shade 33 shields a portion of the light emitted from the light emitting element 32a.

Similarly to the projection lens 15, the projection lens 35 is a lens that adjusts a divergence angle of incident light. In the present embodiment, the projection lens 35 is a lens in which the incident surface and the emission surface are formed in a convex shape, and is disposed in front of the shade 33. The rear focal point of the projection lens 35 is located on or near the upper edge of the light shielding portion 33a of the shade 33. As described above, a portion of the light emitted from the light emitting element 32a is shielded by the light shielding portion 33a of the shade 33, another portion of the light emitted from the light emitting element 32a is incident on the projection lens 35, and light of a specific light distribution pattern corresponding to the shape of the light shielding portion 33a is emitted from the projection lens 35. Note that this specific light distribution pattern is a light distribution pattern in which a light distribution pattern when a portion of light is shielded by the light shielding portion 33a is reversed vertically and horizontally. As described above, the light having the specific light distribution pattern emitted from the projection lens 35 is emitted from the third lamp unit 30 toward the front of the vehicle 100 via the front cover 38.

Next, as the control unit CO illustrated in FIG. 1, for example, an integrated circuit such as a microcontroller, an integrated circuit (IC), a large-scale integrated circuit (LSI), or an application specific integrated circuit (ASIC), or a numerical control (NC) device can be used. In addition, when the NC device is used, the control unit CO may use a machine learning device or may not use a machine learning device. As described later, the control unit CO controls the first lamp unit 10, the second lamp unit 20, and the third lamp unit 30.

The light switch 120 included in the vehicle 100 is connected to the control unit CO. The light switch 120 of the present embodiment is a switch that selects one of emission of a low beam, emission of a high beam, and non-emission of light. For example, the light switch 120 outputs a signal indicating emission of a low beam to the control unit CO in a case where emission of a low beam is selected, and outputs a signal indicating emission of a high beam to the control unit CO in a case where emission of a high beam is selected. In addition, the light switch 120 does not output a signal to the control unit CO when non-emission of light is selected.

The detection device 110 of the present embodiment detects another vehicle located in front of the vehicle 100. When detecting another vehicle, the detection device 110 outputs a signal indicating detection of the other vehicle to the region determination unit 55 via the determination unit 50. The detection device 110 also detects the state of another vehicle detected, and outputs a signal indicating the state of the other vehicle to the region determination unit 55 via the determination unit 50. Note that the detection device 110 may directly output these signals to the region determination unit 55. Examples of the state of the other vehicle include a position of the other vehicle with respect to the vehicle 100, whether the other vehicle is a preceding vehicle or an oncoming vehicle, a distance from the vehicle 100 to the other vehicle, and the like. The detection device 110 includes, for example, a camera, a detection unit, and the like (not illustrated). The camera is attached to the front portion of the vehicle 100, and captures an image of the front of the vehicle 100 at predetermined time intervals, for example, 1/30 second intervals. The captured image captured by the camera includes at least a portion of a region irradiated with light emitted from the pair of lamp units 5. The detection unit detects another vehicle located in front of the vehicle 100 and detects a state of the other vehicle from the captured image captured by the camera.

For example, when the other vehicle is an oncoming vehicle, a pair of white light spots due to light emitted from a headlight of the oncoming vehicle appear in the captured image. The detection unit outputs a signal indicating detection of another vehicle and a signal indicating that the other vehicle is an oncoming vehicle to the determination unit 50, assuming that the pair of white light spots correspond to light from the headlight of the oncoming vehicle. The detection unit may output a signal indicating that the other vehicle is an oncoming vehicle assuming that the signal indicating that the other vehicle is an oncoming vehicle includes detection of the other vehicle. In addition, the detection unit calculates the distance from the vehicle 100 to the oncoming vehicle on the basis of the distance between the pair of white light spots and the like. Then, the detection unit outputs a signal indicating the positions of a pair of white light spots in the captured image as a signal indicating the position of the oncoming vehicle with respect to the vehicle 100 and a signal indicating the calculated distance to the determination unit 50. In addition, in a case where the other vehicle is a preceding vehicle, a pair of red light spots due to light emitted from the tail light of the preceding vehicle appear in the captured image. The detection unit outputs a signal indicating detection of another vehicle and a signal indicating that the other vehicle is a preceding vehicle to the determination unit 50, assuming that a pair of red light spots correspond to light from the tail light of the preceding vehicle. The detection unit may output a signal indicating that the other vehicle is a preceding vehicle assuming that the signal indicating that the other vehicle is a preceding vehicle includes detection of the other vehicle. In addition, the detection unit calculates the distance from the vehicle 100 to the preceding vehicle on the basis of the distance between the pair of red light spots and the like. Then, the detection unit outputs, to the determination unit 50, a signal indicating the positions of a pair of red light spots in the captured image as a signal indicating the position of the preceding vehicle with respect to the vehicle 100, and a signal indicating the calculated distance.

On the other hand, when the detection unit does not detect another vehicle located in front of the vehicle 100, the detection unit does not output a signal to determination unit 50.

Examples of the configuration of the detection unit include a configuration similar to that of the control unit CO, and examples of the camera include a complementary metal oxide semiconductor (C-MOS) camera and a charged coupled device (CCD) camera.

Note that the configuration of the detection device 110, the method of detecting another vehicle by the detection device 110, the method of calculating the distance from the vehicle 100 to the other vehicle, the method of identifying an oncoming vehicle and a preceding vehicle, and the signal indicating the state of the other vehicle output from the detection device 110 to the determination unit 50 are not particularly limited. For example, the detection device 110 may further include an image processing unit that performs image processing on the captured image captured by the camera, and the detection unit may detect another vehicle and detect the state of the other vehicle from the information subjected to the image processing by the image processing unit. Furthermore, the detection device 110 may further include a millimeter-wave radar, a LIDAR, or the like capable of detecting an object located in front of the vehicle 100, and may detect another vehicle located in front of the vehicle 100 and detect a state of the other vehicle on the basis of a captured image captured by a camera and a signal input from the millimeter-wave radar, the LIDAR, or the like.

The determination unit 50 determines whether the detected other vehicle satisfies a predetermined requirement based on a signal indicating a state of the other vehicle from detection device 110 that detects the other vehicle located in front of the vehicle 100. Examples of the predetermined requirement include that a distance between another vehicle and the vehicle 100 is less than a predetermined distance, a headlight of an oncoming vehicle is turned on, a tail light of a preceding vehicle is turned on, and at least two of these requirements are satisfied. The predetermined requirement of the present embodiment is that a distance between another vehicle and the vehicle 100 is less than a predetermined distance, and the predetermined distance is, for example, 100 m. The predetermined distance may be different between a case where the other vehicle is a preceding vehicle and a case where the other vehicle is an oncoming vehicle. In a case where the other vehicle satisfies the predetermined requirement, the determination unit 50 of the present embodiment outputs, as a signal indicating the state of the other vehicle, a signal indicating information such as a captured image obtained by capturing the other vehicle and an existing position of the other vehicle in the captured image to the region determination unit 55. In addition, when the other vehicle does not satisfy the predetermined requirement and when no signal is input from the detection device 110 to the determination unit 50, the determination unit 50 does not output a signal to the region determination unit 55. Therefore, the determination by the determination unit 50 can be understood as changing the signal to be output in a case-by-case manner according to the signal input from the detection device 110 as described above. Examples of the configuration of the determination unit 50 include the same configuration as the control unit CO.

Based on the signal indicating the state of the other vehicle output from the detection device 110 via the determination unit 50, the region determination unit 55 determines a predetermined region overlapping with a visual recognition portion for the driver of the other vehicle to visually recognize the outside of the vehicle, and outputs a signal indicating the predetermined region to the control unit CO. Therefore, this predetermined region is not a region determined in advance. However, the region determination unit 55 may select a region to be the predetermined region from a plurality of predetermined regions based on a signal indicating a state of another vehicle from the determination unit 50, and determine the region as the predetermined region. Examples of the visual recognition portion for the driver of the other vehicle to visually recognize the outside of the vehicle include a front window in a case where the other vehicle is an oncoming vehicle, and include a side mirror, a rear-view mirror, and an imaging device that images the rear of the vehicle in a case where the other vehicle is a preceding vehicle. The predetermined region preferably overlaps with the entire visual recognition portion of such another vehicle. In the present embodiment, the region determination unit 55 determines a rectangular region including the entire other vehicle as a predetermined region on a virtual vertical screen arranged 25 meters ahead of the vehicle 100. A predetermined gap is formed between the outer edge of the predetermined region and the outer edge of another vehicle. The region determination unit 55 determines such a predetermined region. On the other hand, when the signal indicating the state of the other vehicle is not input, the region determination unit 55 does not output a signal to the control unit CO. In this case, the region determination unit 55 may output a signal indicating that the predetermined region is not determined to the control unit CO. Examples of the configuration of the region determination unit 55 include the same configuration as the control unit CO. Note that the region determination unit 55 may also serve as the determination unit 50. The shape of the predetermined region is not particularly limited.

One power supply circuit 60 corresponds to one lamp unit 5, and the other power supply circuit 60 corresponds to the other lamp unit 5. Each of the power supply circuits 60 includes a driver, and when a signal is input from the control unit CO, the driver adjusts power supplied to each of the light emitting elements 13a to 13h of the first lamp unit 10, each of the light emitting elements 23 of the second lamp unit 20, and the light emitting element 32a of the third lamp unit 30. In this way, the amount of light emitted from each of the light emitting elements 13a to 13h, 23, and 32a is adjusted. The driver of the power supply circuit 60 may adjust the power supplied to each of the light emitting elements 13a to 13h, 23, and 32a by pulse width modulation (PWM) control. In this case, the amount of light emitted from each of the light emitting elements 13a to 13h, 23, and 32a is adjusted by adjusting the duty cycle.

Next, a low beam emitted from the vehicle headlight 1 will be described.

In the present embodiment, a light distribution pattern of a low beam is formed by the light emitted from the second lamp unit 20 and the light emitted from the third lamp unit 30.

Figure 10:
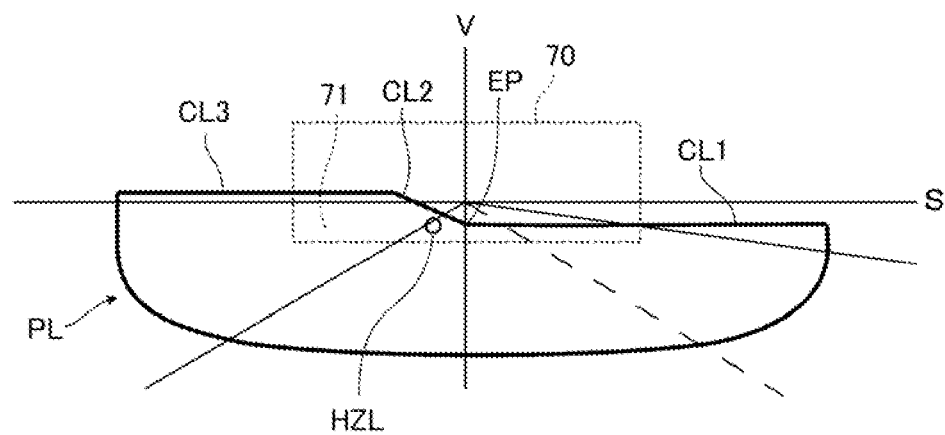
FIG. 10 is a diagram illustrating a light distribution pattern of a low beam in the first embodiment.

FIG. 10 is a diagram illustrating a light distribution pattern of a low beam in the present embodiment. In FIG. 10, S indicates a horizontal line, V indicates a vertical line passing through the center of the vehicle 100 in the horizontal direction, and a light distribution pattern PL of a low beam formed on a virtual vertical screen arranged 25 meters ahead of the vehicle 100 is indicated by a thick line. In FIG. 10, a region 70 that can be irradiated with the light from the second lamp unit 20 is indicated by a broken line.

The light distribution pattern PL of the low beam of the present embodiment has cutoff lines CL1, CL2, and CL3 at the upper edge. The cutoff line CL1 extends in the horizontal direction to the right side, which is one side in the horizontal direction, from an elbow point EP located below the horizontal line S and on or near the vertical line V. The cutoff line CL2 extends obliquely upward from the elbow point EP to the left side which is the other side in the horizontal direction, and an end of the cutoff line CL2 on the side opposite to the elbow point EP is located above the horizontal line S. The cutoff line CL3 extends in the horizontal direction from an end of the cutoff line CL2 opposite to the elbow point EP side to the other side in the horizontal direction. In addition, a hot zone HZL, which is a region having the highest light intensity in the light distribution pattern PL of the low beam, is located in the vicinity of the elbow point EP. In a country or an area where right-hand traffic of the vehicle is used, the light distribution pattern of the low beam has a substantially symmetrical shape with the light distribution pattern PL of the low beam illustrated in FIG. 10, the cutoff line CL1 extends horizontally to the left from the elbow point EP, and the cutoff line CL2 extends obliquely upward to the right from the elbow point EP.

The shape of the upper end of the light shielding portion 33a of the shade 33 in the third lamp unit 30 corresponds to the upper edge of the light distribution pattern PL of the low beam, and the outer shape of the specific light distribution pattern of the light emitted from the third lamp unit 30 substantially matches the outer shape of the light distribution pattern PL of the low beam. In addition, in the light distribution pattern PL of the low beam, the hot zone HZL is included in an overlapping region 71 overlapping with the region 70 that can be irradiated with the light from the second lamp unit 20, and the overlapping region 71 is irradiated with the light from the second lamp unit 20. In other words, light is emitted from the light emitting element 23 corresponding to the second irradiation spot S2 located in the overlapping region 71, and the overlapping region 71 is irradiated with the light from the second lamp unit 20 and the light from the third lamp unit 30. The light intensity distribution in the overlapping region 71 is, for example, a distribution in which the intensity decreases as the distance from the hot zone HZL increases. The amount of the light emitted from each light emitting element 23 is adjusted by the control unit CO so that the light intensity distribution in the overlapping region 71 has such a distribution. As described above, light is emitted from the second lamp unit 20 and the third lamp unit 30, whereby a low beam is emitted from the vehicle headlight 1.

Next, the high beam emitted from the vehicle headlight 1 will be described.

In the present embodiment, a light distribution pattern of a high beam is formed by the light emitted from the first lamp unit 10, the light emitted from the second lamp unit 20, and the light emitted from the third lamp unit 30.

Figure 11:
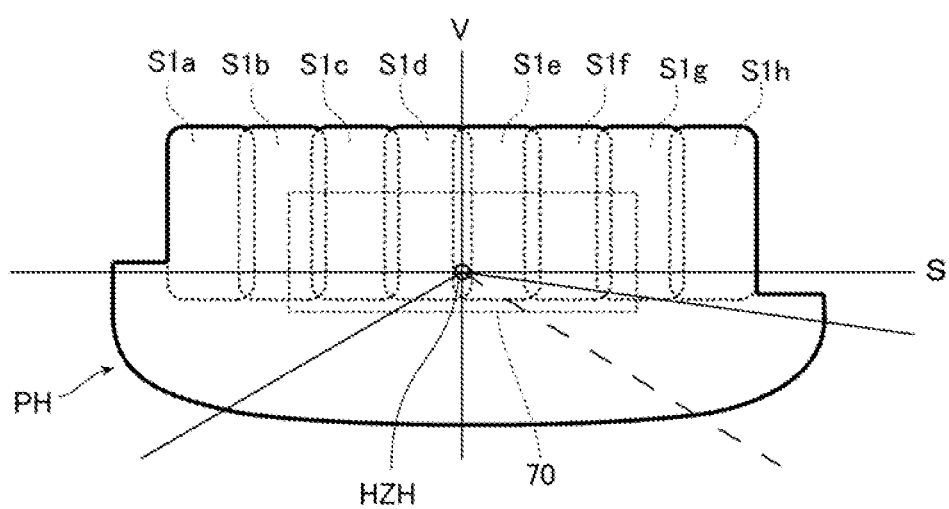
FIG. 11 is a diagram illustrating a light distribution pattern of a high beam in the first embodiment.

FIG. 11 is a diagram illustrating a light distribution pattern of a high beam in the present embodiment. In FIG. 11, S indicates a horizontal line, V indicates a vertical line passing through the center of the vehicle 100 in the horizontal direction, and a light distribution pattern PH of a high beam formed on a virtual vertical screen arranged 25 meters ahead of the vehicle 100 is indicated by a thick line. In FIG. 11, a region 70 that can be irradiated with the light from the second lamp unit 20 is indicated by a broken line together with the first irradiation spots S1*a* to S1*h*. In the present embodiment, the hot zone HZH, which is the region having the highest light intensity in the light distribution pattern PH of the high beam, is located on or near the intersection of the horizontal line S and the vertical line V, and overlaps with the two first irradiation spots S1*d* and S1*e* and the region 70.

In the present embodiment, when a high beam is emitted from the vehicle headlight 1, light is emitted from all the light emitting elements 13*a* to 13*h* in the first lamp unit 10 and from all the light emitting elements 23 in the second lamp unit 20. Therefore, the first irradiation spots S1*a* to S1*h* are irradiated with the light from the corresponding light emitting elements 13*a* to 13*h*, and the region 70 is irradiated with the light from the light emitting element 23. In addition, the third lamp unit 30 emits the same light as when forming the low beam. The light intensity distribution in the region overlapping with the region 70 in the light distribution pattern PH of the high beam is, for example, a distribution in which the intensity decreases as the distance from the hot zone HZH increases. The amount of light emitted from each light emitting element 23 is adjusted by the control unit CO so that the intensity of light in the region 70 has such a distribution. As described above, light is emitted from the first lamp unit 10, the second lamp unit 20, and the third lamp unit 30, whereby a high beam is emitted from the vehicle headlight 1.

Figure 12:
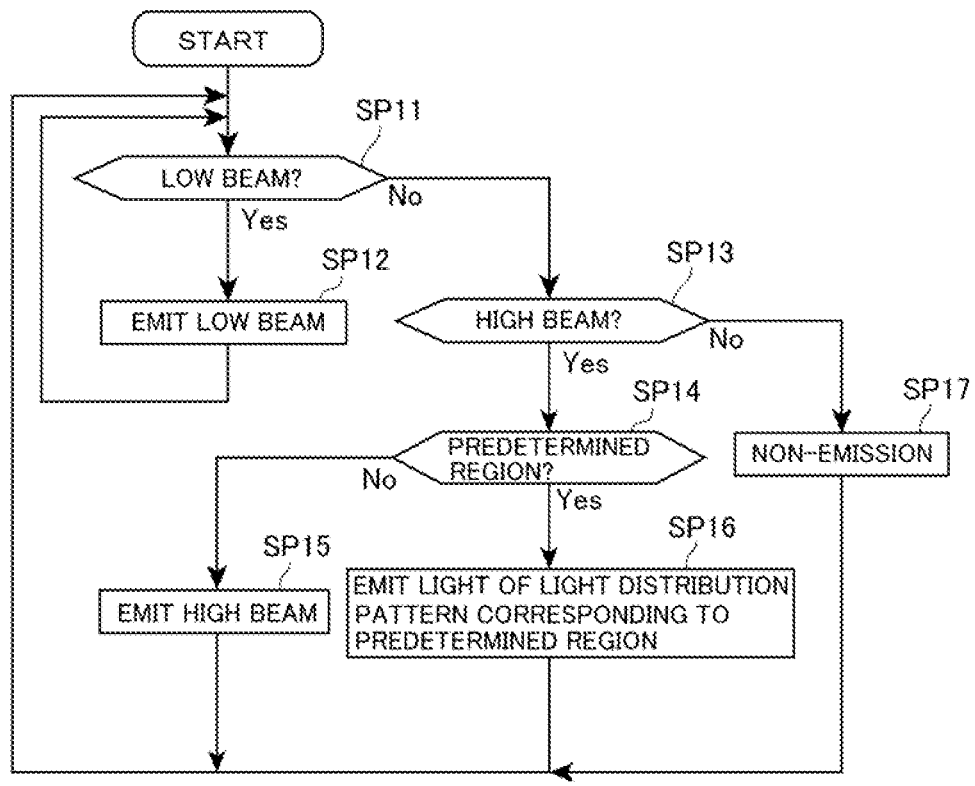
FIG. 12 is a diagram illustrating an example of a control flowchart of a control unit according to the first embodiment.

Next, the operation of the vehicle headlight 1 of the present embodiment will be described. FIG. 12 is a diagram illustrating an example of a control flowchart of the control unit according to the present embodiment. As illustrated in FIG. 12, the control flow of the present embodiment includes steps SP11 to SP17.

(Step SP11)

First, the control unit CO determines whether a signal indicating emission of a low beam is input from the light switch 120. When this signal is input to the control unit CO, the control unit CO advances the control flow to step SP12. On the other hand, when this signal is not input to the control unit CO, the control unit CO advances the control flow to step SP13. For this reason, the determination of the control unit CO can be understood as changing the step to proceed to the next in a case-by-case manner according to the input signal.

(Step SP12)

In this step, the control unit CO controls the first lamp unit 10, the second lamp unit 20, and the third lamp unit 30 so that a low beam is emitted from the vehicle headlight 1. Specifically, the control unit CO outputs a predetermined control signal corresponding to the low beam to the power supply circuit 60. As a result, the supply of power to all the light emitting elements 13*a* to 13*h* is stopped by the driver of the power supply circuit 60, and the power supplied to the light emitting elements 32*a* is adjusted to be predetermined power, and the power supplied to each light emitting element 23 is adjusted to be power corresponding to a low beam. Therefore, light to be a portion of the low beam is emitted from the second lamp unit 20, and light to be another portion of the low beam is emitted from the third lamp unit 30, so that the low beam is emitted from the vehicle headlight 1. Then, the control unit CO returns the control flow to step SP11.

(Step SP13)

In this step, the control unit CO determines whether or not a signal indicating emission of a high beam is input from the light switch 120. When this signal is input to the control unit CO, the control unit CO advances the control flow to step SP14. On the other hand, when this signal is not input to the control unit CO, the control unit CO advances the control flow to step SP17.

(Step SP14)

In this step, the control unit CO determines whether the predetermined region is determined by the region determination unit 55 based on the signal input from the region determination unit 55. In a case where the signal is not input from the region determination unit 55 to the control unit CO, the control unit CO advances the control flow to step SP15. On the other hand, when a signal is input from the region determination unit 55 to the control unit CO, the control unit CO advances the control flow to step SP16.

(Step SP15)

In this step, the control unit CO controls the first lamp unit 10, the second lamp unit 20, and the third lamp unit 30 so that a high beam is emitted from the vehicle headlight 1. Specifically, the control unit CO outputs a predetermined control signal corresponding to the high beam to the power supply circuit 60. As a result, the driver of the power supply circuit 60 adjusts the power supplied to each of the light emitting elements 13*a* to 13*h* of the light distribution pattern forming unit 12 to a predetermined power, the power supplied to the light emitting element 32*a* of the light source unit 32 to a predetermined power, and the power supplied to each of the light emitting elements 23 of the light distribution pattern forming unit 22 to a power corresponding to a high beam. Therefore, light to be a portion of the high beam is emitted from the first lamp unit 10, light to be another portion of the high beam is emitted from the second lamp unit 20, and light to be another portion of the high beam is emitted from the third lamp unit 30, whereby the low beam is emitted from the vehicle headlight 1. Then, the control unit CO returns the control flow to step SP11. As described above, the light distribution pattern of the light emitted from the third lamp unit 30 is the same specific light distribution pattern as the light distribution pattern of the light emitted from the third lamp unit 30 when a low beam is emitted from the vehicle headlight 1.

(Step SP16)

In this step, the control unit CO controls the first lamp unit 10, the second lamp unit 20, and the third lamp unit 30 so that the light distribution pattern of the light emitted from the vehicle headlight 1 becomes a light distribution pattern corresponding to the predetermined region determined by the region determination unit 55. Then, the control unit CO returns the control flow to step SP11.

Figure 13:
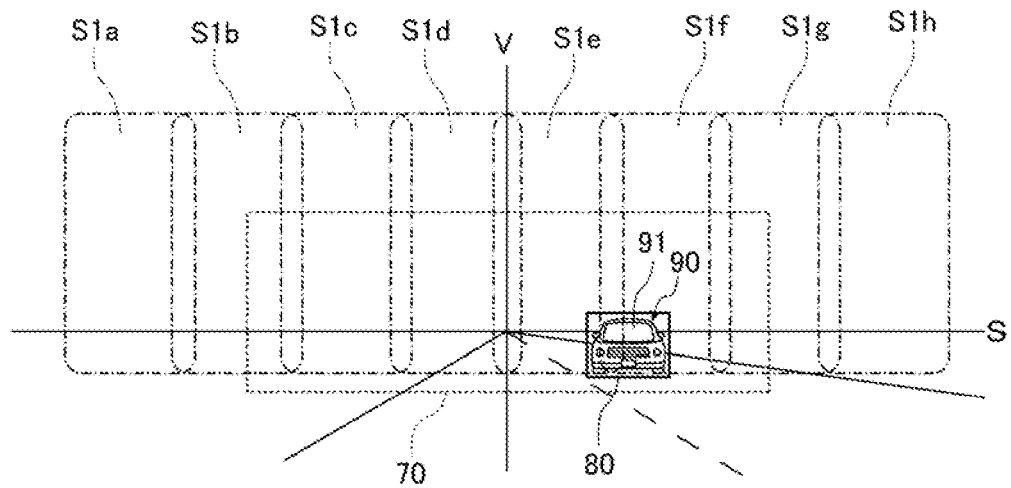
FIG. 13 is a diagram illustrating an example of a predetermined region determined by a region determination unit.
Figure 14:
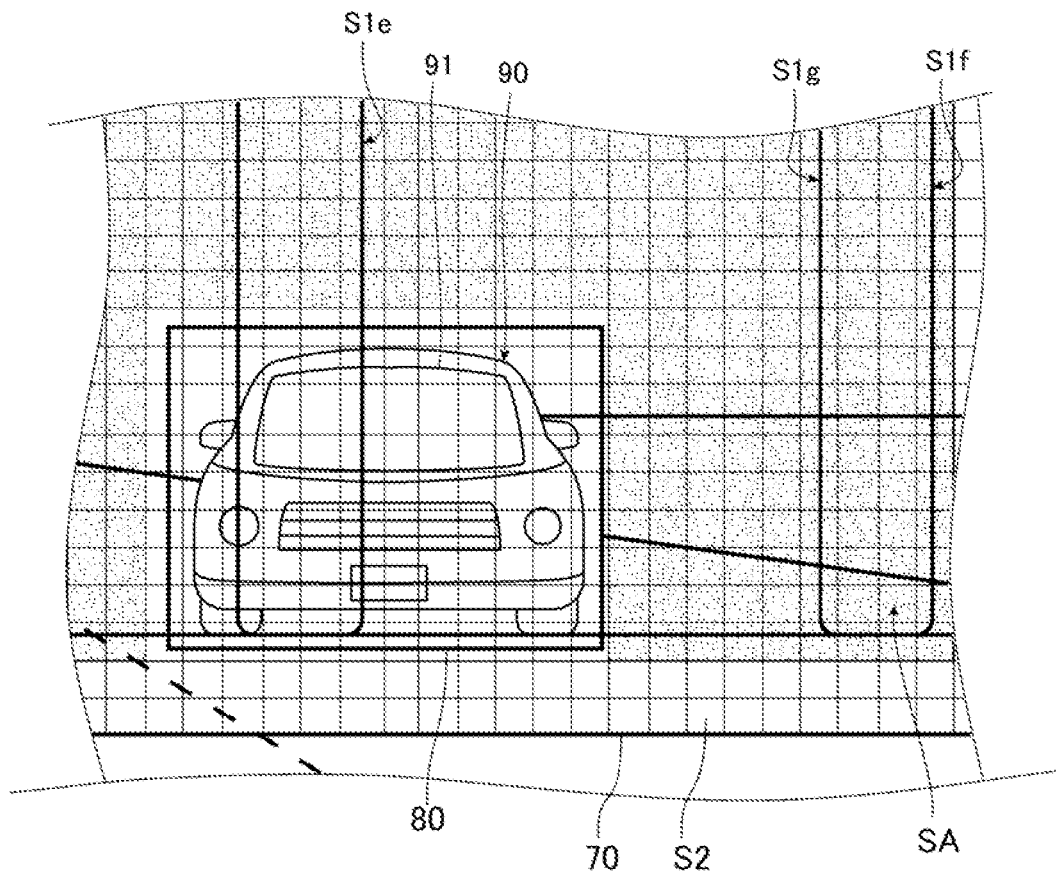
FIG. 14 is an enlarged view of a predetermined region and its vicinity in FIG. 13.

FIG. 13 is a diagram illustrating an example of a predetermined region 80 determined by the region determination unit 55, and is a diagram illustrating an example of the predetermined region 80 determined when the other vehicle 90 that is an oncoming vehicle is detected by the detection device 110 and the determination unit 50 determines that the other vehicle 90 satisfies a predetermined requirement. FIG. 14 is an enlarged view of the predetermined region 80 and its vicinity in FIG. 13. In FIG. 13, S indicates a horizontal line, V indicates a vertical line passing through the center of the vehicle 100 in the horizontal direction, and the predetermined region 80 on a virtual vertical screen arranged 25 meters ahead of the vehicle 100 is indicated by a thick line. In FIG. 13, the first irradiation spots S1*a* to S1*h* are indicated by alternate long and short dash lines, and the region 70 is indicated by a broken line. In FIG. 14, the second irradiation spots S2 are indicated by a thin line. For easy understanding, the number of second irradiation spots S2 is reduced in FIG. 14. The plurality of second irradiation spots S2 are illustrated such that adjacent second irradiation spots S2 are in contact with each other, but adjacent second irradiation spots S2 overlap with each other.

As described above, in the present embodiment, the predetermined region 80 has a rectangular shape including the entire other vehicle 90 that is an oncoming vehicle, and a predetermined gap is formed between the outer edge of the predetermined region 80 and the outer edge of the other vehicle 90. For this reason, the predetermined region 80 overlaps with a front window 91 as a visual recognition portion for the driver of the other vehicle 90, which is an oncoming vehicle, to visually recognize the outside of the vehicle. The control unit CO controls the first lamp unit 10 according to the positional relationship between the predetermined region 80 and the first irradiation spots S1a to S1h. Specifically, the control unit CO controls the light emitting elements 13e and 13f such that the amount of light emitted from the light emitting elements 13e and 13f corresponding to the first irradiation spots S1e and S1f overlapping with the predetermined region 80 is reduced or becomes 0 as compared with the amount of light when a high beam is emitted. In addition, the control unit CO controls the light emitting elements 13a to 13d, 13g, and 13h such that the amount of light emitted from the light emitting elements 13a to 13d, 13g, and 13h corresponding to the first irradiation spots S1a to S1d, S1g, and S1h not overlapping with the predetermined region 80 becomes the amount of light when a high beam is emitted. Specifically, the control unit CO outputs a control signal to the power supply circuit 60 so that the amount of the light emitted from each of the light emitting elements 13a to 13h becomes such a light amount, and the power supplied to each of the light emitting elements 13a to 13h is adjusted by the driver of the power supply circuit 60. In the present embodiment, the control unit CO controls the first lamp unit 10 so that the amount of light emitted from the light emitting elements 13e and 13f becomes zero.

Further, the control unit CO controls the second lamp unit 20 according to the positional relationship between the predetermined region 80 and the second irradiation spot S2. Specifically, the control unit CO controls the light emitting element 23 such that the amount of the light emitted from the light emitting element 23 corresponding to the second irradiation spot S2 overlapping with the predetermined region 80 is smaller than the light amount when a high beam is emitted. In addition, the control unit CO controls the light emitting element 23 so that light is emitted from the light emitting element 23 corresponding to the hatched second irradiation spot S2 made up of a plurality of points in FIG. 14. The hatched second irradiation spot S2 overlaps with the first irradiation spots S1e and S1f overlapping with the predetermined region 80 and does not overlap with the predetermined region 80. Further, the control unit CO controls the light emitting element 23 such that the amount of the light emitted from the light emitting element 23 corresponding to the second irradiation spot S2 not overlapping with the first irradiation spots S1e and S1f overlapping with the predetermined region 80 becomes the same as the light amount when a high beam is emitted. Specifically, the control unit CO outputs a control signal to the power supply circuit 60 such that the amount of light emitted from each light emitting element 23 becomes as described above, and the power supplied to each light emitting element 23 is adjusted by the driver of the power supply circuit 60. In the present embodiment, the control unit CO controls the second lamp unit 20 so that the amount of the light emitted from the light emitting element 23 corresponding to the second irradiation spot S2 overlapping with the predetermined region 80 becomes zero, and the amount of the light from the light emitting element 23 corresponding to the hatched second irradiation spot S2 becomes the same as the light amount when a high beam is emitted. However, the amount of the light from the light emitting element 23 corresponding to the hatched second irradiation spot S2 may be different from the light amount when a high beam is emitted.

Further, the control unit CO controls the third lamp unit 30 so that light having the same specific light distribution pattern as the light distribution pattern of the light emitted from the third lamp unit 30 is emitted when a high beam is emitted regardless of the predetermined region 80.

Figure 15:
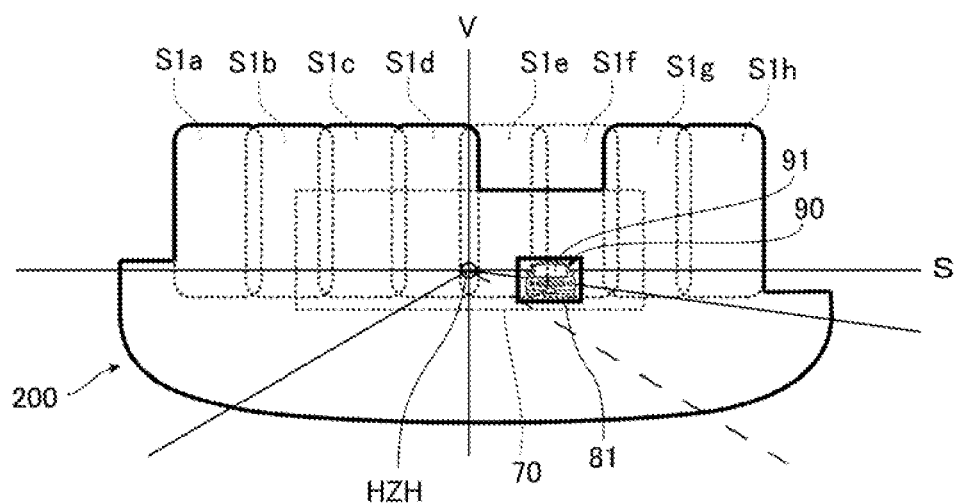
FIG. 15 is a diagram illustrating an example of a light distribution pattern corresponding to the predetermined region illustrated in FIG. 14.

FIG. 15 is a diagram illustrating an example of the light distribution pattern corresponding to the predetermined region 80 illustrated in FIG. 14. In FIG. 15, S indicates a horizontal line, V indicates a vertical line passing through the center of the vehicle 100 in the horizontal direction, and a light distribution pattern 200 on a virtual vertical screen arranged 25 meters ahead of the vehicle 100 is indicated by a thick line. As described above, the amount of the light emitted from the light emitting elements 13a to 13d, 13g, and 13h corresponding to the first irradiation spots S1a to S1d, S1g, and S1h other than the first irradiation spots S1e and S1f and the amount of the light emitted from the light emitting element 23 corresponding to the second irradiation spot S2 not overlapping with the first irradiation spots S1e and S1f are the same as the light amount when a high beam is emitted. The light emitted from the third lamp unit 30 is the same as the light when a high beam is emitted. Therefore, the light distribution pattern 200 is a light distribution pattern in which the light intensity distribution in the region overlapping with the first irradiation spots S1e and S1f changes in the light distribution pattern PH of the high beam. As described above, the amount of the light emitted from the light emitting elements 13e and 13e corresponding to the first irradiation spots S1e and S1f overlapping with the predetermined region 80 and the amount of the light emitted from the light emitting element 23 corresponding to the second irradiation spot S2 overlapping with the predetermined region 80 are smaller than the light amount when a high beam is emitted. Therefore, the light distribution pattern 200 includes the predetermined region 80 and has a light reduction region 81 in which the light amount is reduced as compared with the case of emitting a high beam, and the light reduction region 81 overlaps with the front window 91 as the visual recognition portion in the other vehicle 90. (Step SP17)

In this step, no signal is input from the light switch 120 to the control unit CO. Therefore, non-emission of light is selected in the light switch 120. The control unit CO controls the lamp units 10, 20, and 30 so that no light is emitted from the first lamp unit 10, the second lamp unit 20, and the third lamp unit 30. Specifically, the control unit CO outputs a predetermined signal to the power supply circuit 60, causes the power supply circuit 60 to stop the supply of power to all the light emitting elements 13a to 13h, all the light emitting elements 23, and the light emitting element 32a, and does not emit light from the vehicle headlight 1. Then, the control flow returns to step SP11.

As described above, in the vehicle headlight 1 of the present embodiment, the light distribution pattern PH of the emitted high beam is changed to a light distribution pattern 200 having the light reduction region 81 when the predetermined region 80 is determined by the region determination unit 55. Note that the control flow of the control unit CO is not particularly limited.

By the way, in the vehicle headlight described in Patent Literature 1 described above, light is not emitted to a surrounding region together with other vehicles, and thus forward visibility tends to decrease.

Therefore, the vehicle headlight 1 of the present embodiment includes the first lamp unit 10, the second lamp unit 20, the region determination unit 55, and the control unit CO. The first lamp unit 10 includes a plurality of light emitting elements 13a to 13h capable of individually changing the amount of light emitted, and emits light from the plurality of light emitting elements 13a to 13h such that first irradiation spots S1a to S1h irradiated with the light from the respective light emitting elements 13a to 13h are aligned in the horizontal direction. The second lamp unit 20 includes a plurality of light emitting elements 23 capable of individually changing the amount of light emitted, and emits light from the plurality of light emitting elements 23 so that second irradiation spots S2 irradiated with the light from the respective light emitting elements 23 are arranged in a matrix. The region determination unit 55 determines a predetermined region 80 that overlaps with a visual recognition portion for the driver of the other vehicle 100 to visually recognize the outside of the vehicle when a signal indicating detection of the other vehicle 90 located in front of the vehicle 90 is input from the detection device 110. The second irradiation spot S2 is smaller than the first irradiation spots S1a to S1h, and the first irradiation spots S1b to S1g overlap with a plurality of second irradiation spots S2. When the predetermined region 80 is not determined by the region determination unit 55, the control unit CO controls the first lamp unit 10 and the second lamp unit 20 so that light is emitted from the first lamp unit 10 and the second lamp unit 20. Further, when the predetermined region 80 is determined by the region determination unit 55, the control unit CO controls the first lamp unit 10 so that the amount of light emitted from the light emitting elements 13e and 13f corresponding to the first irradiation spots S1e and S1f overlapping with the predetermined region 80 is reduced or becomes zero. In this case, the control unit CO controls the second lamp unit 20 so that the amount of the light emitted from the light emitting element 23 corresponding to the second irradiation spot S2 overlapping with the predetermined region 80 is reduced or becomes zero, and the light is emitted from the light emitting element 23 corresponding to the second irradiation spot S2 overlapping with the first irradiation spots S1e and S1f overlapping with the predetermined region 80 and not overlapping with the predetermined region 80.

In the vehicle headlight 1 of the present embodiment, the amount of light emitted from the first lamp unit 10 and irradiated on the visual recognition portion of the other vehicle 90 is reduced or becomes zero, and the amount of light emitted from the second lamp unit 20 and irradiated on the visual recognition portion of the other vehicle 90 is reduced or becomes zero. Therefore, according to the vehicle headlight 1 of the present embodiment, it is possible to suppress dazzling of the occupant of the other vehicle 90. In addition, in the vehicle headlight 1 of the present embodiment, the second irradiation spot S2 overlapping with the first irradiation spots S1e and S1f in which the amount of the emitted light is reduced and not overlapping with the predetermined region 80 is irradiated with light. Therefore, at least a portion of the region that does not overlap with the predetermined region 80 among the first irradiation spots S1e and S1f in which the amount of the emitted light is reduced can be irradiated with the light from the second lamp unit 20. Therefore, according to the vehicle headlight 1 of the present embodiment, the forward visibility can be improved as compared with the case where the second lamp unit 20 is not provided.

In the vehicle headlight 1 of the present embodiment, when the predetermined region 80 is determined by the region determination unit 55, the control unit CO controls the second lamp unit 20 so that the amount of the light emitted from the light emitting element 23 corresponding to the second irradiation spot S2 overlapping with the first irradiation spots S1e and S1f overlapping with the predetermined region 80 and not overlapping with the predetermined region 80 does not change from the light amount when the predetermined region 80 is not determined by the region determination unit 55. Therefore, according to the vehicle headlight 1 of the present embodiment, the control of the second lamp unit 20 by the control unit CO can be simplified as compared with the case where the amount of the light changes.

When the predetermined region 80 is determined by the region determination unit 55, the control unit CO may control the second lamp unit 20 so that the amount of light emitted from the light emitting element 23 corresponding to the second irradiation spot S2 overlapping with the first irradiation spots S1e and S1f overlapping with the predetermined region 80 and not overlapping with the predetermined region 80 increases as compared with the case where the predetermined region 80 is not determined by the region determination unit 55. In this case, as compared with the case where the amount of the light does not increase, it is possible to increase the amount of the light from the second lamp unit 20 irradiated to at least a portion of the region that does not overlap with the predetermined region 80 among the first irradiation spots S1e and S1f in which the amount of the emitted light is reduced, and it is possible to further improve the forward visibility. When the predetermined region 80 is not determined by the region determination unit 55, the amount of the light is preferably a total light amount obtained by adding the amount of the light from the first lamp unit 10 and the amount of the light from the second lamp unit irradiated to the second irradiation spot S2 overlapping with the first irradiation spots S1e and S1f overlapping with the predetermined region 80 and not overlapping with the predetermined region 80. With such a configuration, it is possible to suppress the driver of the vehicle 100 from feeling uncomfortable about a region overlapping with the first irradiation spots S1e and S1f overlapping with the predetermined region 80 and not overlapping with the predetermined region 80.

When at least one first irradiation spot overlaps with at least two second irradiation spots as in the present embodiment, the control unit CO may control the second lamp unit 20 such that the amount of the light emitted from the light emitting element 23 corresponding to the second irradiation spot S2 closer to the predetermined region 80 among the second irradiation spots S2 overlapping with the first irradiation spots S1e and S1f overlapping with the predetermined region 80 and not overlapping with the predetermined region 80 is larger when the predetermined region 80 is not determined by the region determination unit 55.

For example, as in the present embodiment, when a portion of the first irradiation spot S1f in which the amount of the emitted light is reduced and a portion of the other first irradiation spot S1g adjacent to the first irradiation spot S1f overlap with each other, as illustrated in FIG. 14, the overlapping region SA overlapping with the other first irradiation spot S1g among the first irradiation spots Sif in which the amount of the emitted light is reduced is irradiated with the light from the light emitting element 13g corresponding to the other first irradiation spot S1g. Here, in the irradiation spot irradiated with light, the intensity of light irradiated from the center side toward the outer edge side tends to decrease. Therefore, the intensity of the light from the light emitting element 13g corresponding to another first irradiation spot S1g irradiated to the overlapping region SA tends to increase toward the predetermined region 80. In the vehicle headlight as described above, among the second irradiation spots S2 overlapping with the first irradiation spots S1e and Sif in which the amount of the emitted light is reduced and not overlapping with the predetermined region 80, the second irradiation spot S2 closer to the predetermined region 80 has higher intensity of the emitted light. For this reason, for example, when second irradiation spot S2 overlapping with the first irradiation spot Sif in which the amount of the emitted light is reduced and not overlapping with the predetermined region 80 overlaps with the overlapping region SA, the light intensity in the overlapping region SA can be made uniform, and the driver can be prevented from feeling uncomfortable about the overlapping region SA.

In addition, in the vehicle headlight 1 of the present embodiment, when the predetermined region 80 is not determined by the region determination unit 55, the control unit CO controls the first lamp unit 10 and the second lamp unit 20 so that light is emitted from the first lamp unit 10 and the second lamp unit 20. Therefore, in this case, the light distribution pattern PH of the high beam is formed by the light including the light emitted from the first lamp unit 10 and the light emitted from the second lamp unit. As described above, at least one first irradiation spot overlaps with at least one second irradiation spot. Therefore, the region irradiated with the light emitted from the first lamp unit 10 and the region irradiated with the light emitted from the second lamp unit 20 can overlap with each other. Therefore, according to the vehicle headlight 1 of the present embodiment, the degree of freedom of the light intensity distribution in the formed light distribution pattern PH of the high beam can be improved as compared with the case where the light from the second lamp unit 20 is not emitted in the above case. In addition, according to the vehicle headlight 1 of the present embodiment, the amount of light emitted from the light emitting element 23 can be reduced or the number of the light emitting elements 23 can be reduced as compared with the case where the light distribution pattern PH of the high beam is formed only by the second lamp unit 20. Therefore, the heat generated in the light emitting element 23 can be easily dispersed, and the light emitting element 23 can be suppressed from being overheated.

In addition, the vehicle headlight 1 of the present embodiment further includes the determination unit 50 that determines whether or not another vehicle is in a state of satisfying a predetermined requirement on the basis of information from the detection device 110. This predetermined requirement is that the distance between the other vehicle and the vehicle 100 is less than the predetermined distance, and the region determination unit 55 determines the predetermined region 80 as described above when the determination unit 50 determines that the other vehicle satisfies the predetermined requirement, and the first lamp unit 10 and the second lamp unit 20 are controlled by the control unit CO as described above. When the distance between the other vehicle and the vehicle 100 increases, dazzling of an occupant of the other vehicle tends to be less likely to occur. Therefore, according to the vehicle headlight 1 of the present embodiment, it is possible to suppress a change in the light distribution pattern PH of the high beam when dazzling of an occupant of another vehicle is unlikely to occur. Note that the region determination unit 55 may determine the predetermined region 80 as described above when a signal indicating detection of another vehicle is input from the detection device 110 regardless of the determination of the determination unit 50, and the vehicle headlight 1 may not include the determination unit 50. In this case, for example, when detecting another vehicle, the detection device 110 directly outputs a signal indicating detection of the other vehicle and a signal indicating a state of the other vehicle to the region determination unit 55.

Second Embodiment

Next, a second embodiment as a first aspect of the present invention will be described in detail. Note that the same or equivalent components as those of the first embodiment are denoted by the same reference numerals and redundant description is omitted unless otherwise specified.

The vehicle headlight 1 of the present embodiment is mainly different from the vehicle headlight 1 of the first embodiment in that a light distribution pattern PH of a high beam is formed by light emitted from a first lamp unit 10 and light emitted from a third lamp unit 30. Therefore, the operation of the vehicle headlight 1 of the present embodiment is different from the operation of the vehicle headlight 1 of the first embodiment. Although the control flowchart of the control unit in the present embodiment is the same as that in the first embodiment, the operation of the control unit CO in steps SP15 and SP16 is different. Therefore, steps SP15 and SP16 will be described, and description of the other steps SP11 to SP14 and SP17 will be omitted.

(Step SP15)

In step SP15 of the present embodiment, the control unit CO controls the lamp units 10, 20 30, and 20 so that light is emitted from the first lamp unit 10 and the third lamp unit 30 and light is not emitted from the second lamp unit so that a high beam is emitted from the vehicle headlight 1. Specifically, the control unit CO outputs a predetermined signal to the power supply circuit 60 to cause the power supply circuit 60 to supply predetermined power to all the light emitting elements 13a to 13h, stop the supply of power to all the light emitting elements 23, and supply predetermined power to the light emitting element 32a. Then, the control unit CO returns the control flow to step SP11. Therefore, the first lamp unit 10 emits light similar to that in step SP15 of the first embodiment, the third lamp unit 30 emits light similar to that in step SP15 of the first embodiment, and the light from the second lamp unit 20 is not emitted. Therefore, a high-beam light distribution pattern having the same outer shape as the high-beam light distribution pattern PH illustrated in FIG. 11 is formed. Note that the light intensity distribution in the region overlapping with the region 70 in the light distribution pattern of the high beam is different from the light intensity distribution in the region overlapping with the region 70 in the light distribution pattern PH of the high beam illustrated in FIG. 11.

(Step SP16)

In step SP16 of the present embodiment, for example, in a case where the predetermined region 80 illustrated in FIGS. 13 and 14 is formed by the region determination unit 55, the control unit CO controls the plurality of light emitting elements 13a to 13h of the first lamp unit 10 similarly to the first embodiment. Therefore, the control unit CO controls the light emitting elements 13e and 13f so that the amount of the light emitted from the light emitting elements 13e and 13e corresponding to the first irradiation spots S1e and S1f overlapping with the predetermined region 80 is smaller than the light amount when a high beam is emitted. In addition, the control unit CO controls the light emitting elements 13a to 13d, 13g, and 13h such that the amount of light emitted from the light emitting elements 13a to 13d, 13g, and 13h corresponding to the first irradiation spots S1a to S1d, S1g, and S1h not overlapping with the predetermined region 80 becomes the amount of light when a high beam is emitted. In the present embodiment, the amount of light emitted from the light emitting elements 13e and 13f is zero.

Here, in the present embodiment, when a high beam is emitted, the light from the second lamp unit 20 is not emitted. The control unit CO controls the light emitting element 23 such that the amount of the light emitted from the light emitting element 23 corresponding to the second irradiation spot S2 overlapping with the predetermined region 80 becomes zero similarly to the case of emitting the high beam. Further, the control unit CO controls the light emitting element 23 so that light is emitted from the light emitting element 23 corresponding to the second irradiation spot S2 hatched in FIG. 14. Further, the control unit CO controls the light emitting element 23 so that the amount of the light emitted from the light emitting element 23 corresponding to the second irradiation spot S2 not overlapping with the first irradiation spots S1e and S1f overlapping with the predetermined region 80 becomes zero similarly to the case of emitting the high beam. Specifically, the control unit CO outputs a control signal to the power supply circuit 60 such that the amount of light emitted from each light emitting element 23 becomes as described above, and the power supplied to each light emitting element 23 is adjusted by the driver of the power supply circuit 60. In the present embodiment, the control unit CO controls the light emitting element 23 corresponding to the hatched second irradiation spot S2 so that the amount of the light from the light emitting element 23 corresponding to the hatched second irradiation spot S2 becomes the same as the amount of the light from the first lamp unit 10 irradiated to the second irradiation spot S2 when a high beam is emitted.

Further, similarly to the first embodiment, the control unit CO controls the third lamp unit 30 so that light having the same specific light distribution pattern as the light distribution pattern of the light emitted from the third lamp unit 30 when emitting the high beam is emitted regardless of the predetermined region 80.

As described above, the first lamp unit 10, the second lamp unit 20, and the third lamp unit 30 are controlled by the control unit CO so that a light distribution pattern having the same outer shape as the light distribution pattern 200 illustrated in FIG. 15 and having the light reduction region 81 overlapping with the front window 91 as the visual recognition portion of the other vehicle 90 while the light amount is reduced as compared with the case of emitting the high beam is formed. The light intensity distribution in this light distribution pattern is different from the light distribution pattern 200 illustrated in FIG. 15.

In the vehicle headlight 1 of the present embodiment, similarly to the first embodiment, the amount of the light emitted from the first lamp unit 10 and irradiated on the visual recognition portion of the other vehicle 90 is reduced, and the amount of the light emitted from the second lamp unit 20 and irradiated on the visual recognition portion of the other vehicle 90 is reduced. Therefore, according to the vehicle headlight 1 of the present embodiment, it is possible to suppress dazzling of the occupant of the other vehicle 90. In addition, in the vehicle headlight 1 of the present embodiment, similarly to the first embodiment, the second irradiation spot S2 overlapping with the first irradiation spots S1e and S1f in which the amount of the emitted light is reduced and not overlapping with the predetermined region 80 is irradiated with light. Therefore, at least a portion of the region that does not overlap with the predetermined region 80 among the first irradiation spots S1e and S1f in which the amount of the emitted light is reduced can be irradiated with the light from the second lamp unit 20. Therefore, according to the vehicle headlight 1 of the present embodiment, similarly to the first embodiment, the forward visibility can be improved as compared with the case where the second lamp unit 20 is not provided.

Although the first aspect of the present invention has been described by taking the first and second embodiments as an example, the first aspect of the present invention is not limited thereto.

For example, in the first and second embodiments, the first lamp unit 10 has been described by taking as an example the first lamp unit 10 that emits light from the plurality of light emitting elements 13a to 13h such that the first irradiation spots S1a to S1h irradiated with the light from the light emitting elements 13a to 13h are arranged in a line in the horizontal direction. However, the first lamp unit may emit light from the plurality of light emitting elements such that the first irradiation spots are arranged at least in the horizontal direction. For example, the first lamp unit may emit light from a plurality of light emitting elements so that the first irradiation spots are arranged vertically and horizontally, or may emit light from a plurality of light emitting elements so that the first irradiation spots are arranged in a plurality of rows in the horizontal direction. Examples of the configuration of such a first lamp unit include a configuration including a plurality of light emitting elements in which light distribution pattern forming units are arranged in a matrix in the first embodiment.

In the first and second embodiments, the second lamp unit 20 including the plurality of light emitting elements 23 capable of individually changing the amount of the emitted light and emitting the light from the plurality of light emitting elements 23 such that the second irradiation spots irradiated with the light from the respective light emitting elements 23 are arranged in a matrix has been described as an example. However, the second lamp unit 20 may have a configuration as illustrated in FIG. 16.

Figure 16:
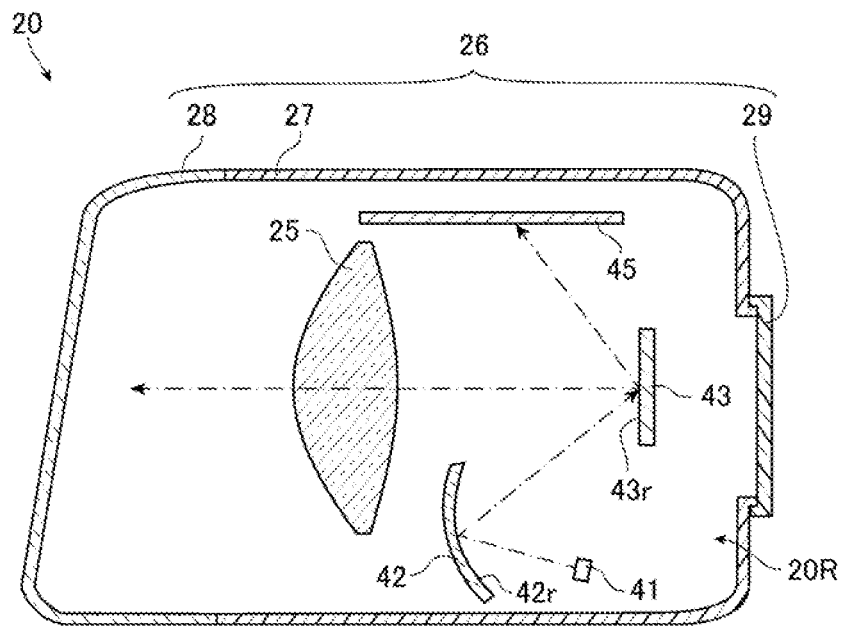
FIG. 16 is a cross-sectional view along a vertical direction schematically illustrating a second lamp unit according to a modification.

FIG. 16 is a cross-sectional view along a vertical direction schematically illustrating a second lamp unit according to a modification. As illustrated in FIG. 16, the second lamp unit 20 of the present modification is mainly different from the first lamp unit 10 of the above embodiment in that a light source 41, a reflector 42, a reflection device 43, and a light absorbing plate 45 are provided as main components instead of the light distribution pattern forming unit 12.

The light source 41 is a light emitting element that emits light. In the present modification, the light source 41 is disposed to emit light forward. Examples of the light source 41 include LEDs.

The reflector 42 is configured to reflect light emitted from the light source 41 by a reflecting surface 42r and irradiate a reflection control surface of the reflection device 43 described later with the light. In the present modification, the reflector 42 is a curved plate-like member, and is disposed so as to cover the light source 41 from the front side. A surface of the reflector 42 on the light source 41 side is the reflecting surface 42r. The reflecting surface 42r is curved so as to be concave on the side opposite to the light source 41 side, and is configured, for example, to condense the light emitted from the light source 41 based on a spheroidal curved surface and irradiate the reflection control surface with the light.

The reflection device 43 of the present modification is a so-called digital mirror device (DMD), has a reflection control surface 43r that reflects incident light, and is configured to be able to form a predetermined light distribution pattern by the light reflected by the reflection control surface 43r. The reflection device 43 is disposed above the light source 41 and behind the reflector 42 such that the reflection control surface 43r faces the front side. The reflection control surface 43r is irradiated with light emitted from the light source 41 and reflected by the reflector 42. The reflection control surface 43r includes reflection surfaces of a plurality of reflective elements arranged in a matrix, and these reflective elements are supported on the substrate so as to be individually tiltable. The plurality of reflective elements can be individually switched between a first tilted state in which light from the reflector 42 is reflected toward the projection lens 15 and a second tilted state in which light from the reflector 42 is reflected toward the light absorbing plate 45 described later. Such a reflection device 43 can form a predetermined light distribution pattern by the light from the reflection control surface 43r toward the projection lens 15 by controlling the tilted state of the reflective element. In addition, by controlling the tilted state of these reflective elements over time, the light intensity distribution of a predetermined light distribution pattern can be set to a desired intensity distribution. That is, it can be understood that the plurality of reflective elements of the reflection device 43 are arranged in a matrix in which the amount of light emitted in the direction toward the projection lens 15 can be individually changed, and the reflection device 43 forms a predetermined light distribution pattern according to the amount of light emitted from the reflection surfaces of the plurality of reflective elements. Further, irradiation spots irradiated with light emitted from the respective reflective elements of the reflection device 43 in a direction toward the projection lens 15 are arranged in a matrix.

The light absorbing plate 45 is a plate-like member having a light absorbing property, and is configured to convert most of incident light into heat. In the present modification, the light absorbing plate 45 is disposed in front of and above the reflection device 43, and light traveling from the reflection control surface 43r toward the light absorbing plate 45 enters the light absorbing plate 45, and most of the light is converted into heat. Examples of the light absorbing plate 45 include a plate-like member made of metal such as aluminum and having a surface subjected to black alumite processing or the like.

Even with such a configuration of the second lamp unit 20, similarly to the first and second embodiments, it is possible to improve the forward visibility while suppressing dazzling of the occupant of the other vehicle. Although not described, the light distribution pattern forming unit may be, for example, a liquid crystal on silicon (LCOS) or a diffraction grating that diffracts incident light to emit light of a predetermined light distribution pattern. Further, the first lamp unit 10 may have such a configuration.

In the first and second embodiments, the vehicle headlight 1 including the third lamp unit 30 has been described as an example. However, the vehicle headlight 1 may not include the third lamp unit 30. The configuration of the third lamp unit 30 is not particularly limited. The third lamp unit 30 may be, for example, a parabolic lamp or a direct lens lamp, or may have a configuration in which the light distribution pattern of emitted light cannot be changed. In the above embodiment, the low beam is formed by the light emitted from the second lamp unit 20 and the light emitted from the third lamp unit 30. However, the low beam may be formed only by the light emitted from the third lamp unit 30.

In the first and second embodiments, the lamp units 10, 20, and 30 each including the housings 16, 26, and 36 have been described as an example. However, these lamp units 10, 20, and 30 may share one housing, and other members different from the housings of the respective lamp units 10, 20, and 30 may be accommodated in a lamp chamber in one housing.

Third Embodiment

Next, a third embodiment as a second aspect of the present invention will be described. Note that the same or equivalent components as those of the first embodiment are denoted by the same reference numerals and redundant description is omitted unless otherwise specified.

Figure 17:
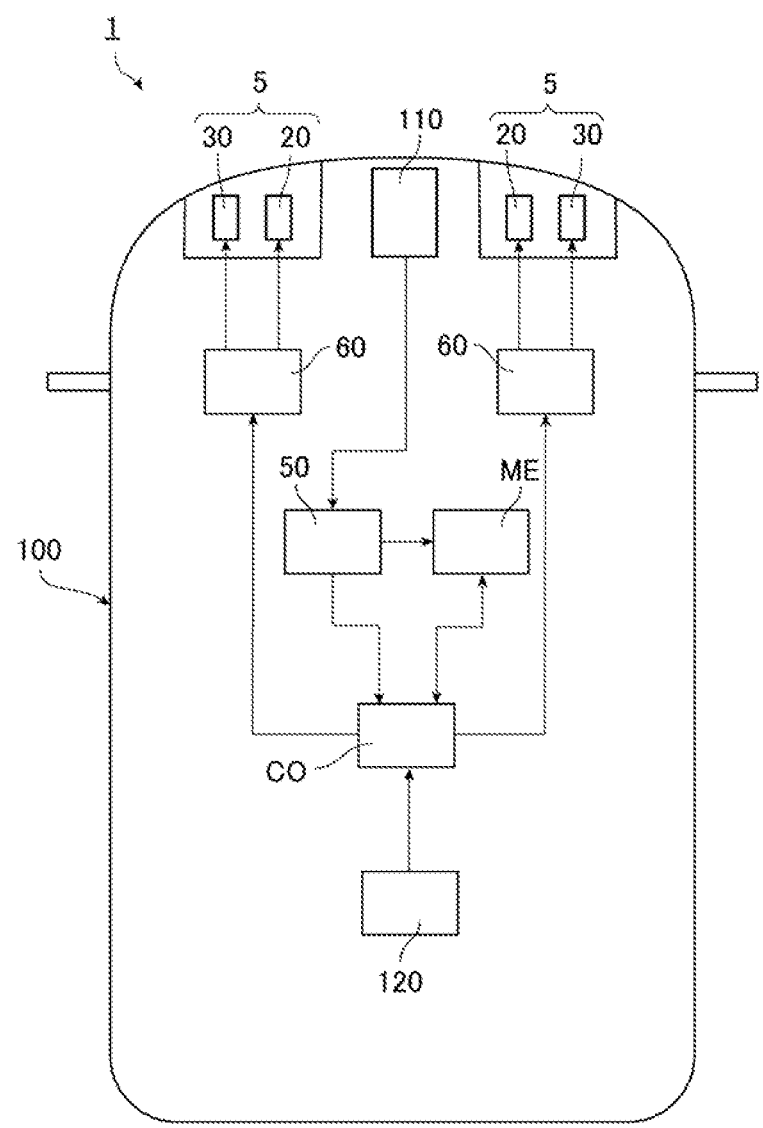
FIG. 17 is a plan view conceptually illustrating a vehicle including a vehicle headlight according to a third embodiment as a second aspect of the present invention.

FIG. 17 is a plan view conceptually illustrating a vehicle including a vehicle headlight of the present embodiment. As illustrated in FIG. 17, the vehicle headlight 1 of the present embodiment is different from the vehicle headlight 1 of the first embodiment mainly in that it does not include the region determination unit 55, includes a memory ME separate from the control unit CO, and does not include the first lamp unit 10 in each lamp unit 5.

When detecting another vehicle, the detection device 110 of the present embodiment outputs a signal indicating detection of the other vehicle and a signal indicating a state of the other vehicle to the control unit CO via the determination unit 50. Note that the detection device 110 may directly output these signals to the control unit CO.

When the other vehicle satisfies the predetermined requirement, the determination unit 50 of the present embodiment outputs, to the control unit CO, a signal indicating the distance from the vehicle 100 to the other vehicle and a signal indicating the position of the other vehicle with respect to the vehicle 100 as signals indicating the state of the other vehicle. In addition, the determination unit 50 stores the information indicating the distance and the position in the memory ME to be described later. These pieces of information stored in the memory ME are rewritten each time the information is stored. In addition, the determination unit 50 does not output a signal to the control unit CO when the other vehicle does not satisfy the predetermined requirement or when a signal is not input from the detection device 110 to the determination unit 50.

The memory ME is configured to store information and read the stored information. The memory ME is, for example, a non-transitory recording medium, and is preferably a semiconductor recording medium such as a random access memory (RAM) or a read only memory (ROM), but may include a recording medium of any format such as an optical recording medium or a magnetic recording medium. Note that the "non-transitory" recording medium includes all computer-readable recording media except for a transitory propagating signal, and does not exclude a volatile recording medium.

The memory ME stores a table in which information on the light distribution pattern formed by the light emitted from the second lamp unit 20 is associated with the state of the other vehicle detected by the detection device 110. Examples of the information on the light distribution pattern formed by the light emitted from the first lamp unit 10 include information on power supplied to each light emitting element 23 of the light distribution pattern forming unit 22. Examples of the information on the power supplied to each light emitting element 23 include information on the power supplied to each light emitting element 23 when a light distribution pattern of a low beam described later is formed, when a light distribution pattern of a high beam is formed, when a light distribution pattern corresponding to another vehicle is formed, and when a light distribution pattern corresponding to another vehicle is changed to a light distribution pattern of a high beam. In addition, examples of the state of the other vehicle detected by the detection device 110 include the distance from the vehicle 100 to the other vehicle, the position of the other vehicle with respect to the vehicle 100, and the like. The memory ME also stores information on predetermined power supplied to the light emitting element 32*a* of the third lamp unit 30 and a reference value. The reference value is a value that is referred to by the control unit CO and rewritten by the control unit CO in the control of the second lamp unit 20 and the third lamp unit 30 to be described later. In the present embodiment, the reference value is either zero or 1, and the initial value is zero.

In the present embodiment, when the signal indicating the emission of the low beam is input from the light switch 120, the control unit CO refers to the information stored in the memory ME, and outputs a signal based on the power supplied to each light emitting element 23 in the light distribution pattern of the low beam and the predetermined power supplied to the light emitting element 32*a* to the power supply circuit 60. As a result, power supplied to each light emitting element 23 is adjusted by the driver of the power supply circuit 60, and predetermined power is supplied to the light emitting element 32*a*. Then, light that becomes a low beam is emitted from the vehicle headlight 1. The light distribution pattern PL of the low beam in the present embodiment is the same as the light distribution pattern PL of the low beam in the first embodiment.

In the present embodiment, a light distribution pattern of a high beam is formed by the light emitted from the second lamp unit 20 and the light emitted from the third lamp unit 30. When the signal indicating the emission of the high beam is input from the light switch 120, the control unit CO refers to the information stored in the memory ME, and outputs a signal based on the power supplied to each light emitting element 23 in the light distribution pattern of the high beam and the predetermined power supplied to the light emitting element 32*a* to the power supply circuit 60. As a result, power supplied to each light emitting element 23 is adjusted by the driver of the power supply circuit 60, and predetermined power is supplied to the light emitting element 32*a*. Then, light that becomes a high beam is emitted from the vehicle headlight 1. In the present embodiment, the light emitted from the third lamp unit 30 is the same as the light emitted from the second lamp unit 20 when a low beam is emitted.

Figure 18:
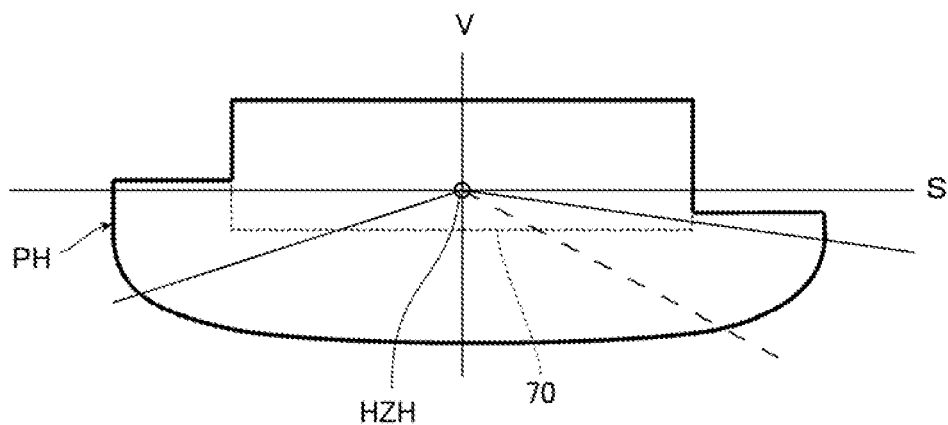
FIG. 18 is a diagram illustrating a light distribution pattern of a high beam in a third embodiment.

FIG. 18 is a diagram illustrating a light distribution pattern of a high beam in the present embodiment. In FIG. 18, S indicates a horizontal line, V indicates a vertical line passing through the center of the vehicle 100 in the horizontal direction, and a light distribution pattern PH of a high beam formed on a virtual vertical screen arranged 25 meters ahead of the vehicle 100 is indicated by a thick line. In FIG. 18, a region 70 that can be irradiated with light from the second lamp unit 20 is indicated by a broken line. In the present embodiment, the outer shape of the region 70 is a rectangle elongated in the horizontal direction similarly to the outer shape of the region 70 in the first embodiment. However, the region 70 of the present embodiment is expanded to the right side, the left side, and the upper side from the region 70 of the first embodiment. That is, the light distribution pattern forming unit 22 and the projection lens 25 of the second lamp unit 20 are adjusted in such a manner. The hot zone HZH, which is a region having the highest light intensity in the light distribution pattern PH of the high beam, is located on or near the intersection of the horizontal line S and the vertical line V, and overlaps with the region 70. In addition, the light distribution pattern PH of the high beam is substantially symmetrical, and the center of the light distribution pattern PH of the high beam in the horizontal direction is located on or near the vertical line V. Although not particularly illustrated, the hot zone HZL in the light distribution pattern PL of the low beam is included in the overlapping region 71 overlapping with the region 70 in the light distribution pattern PL of the low beam similarly to the first embodiment.

In the present embodiment, when a high beam is emitted from the vehicle headlight 1, light is emitted from all the light emitting elements 23 in the second lamp unit 20. Therefore, the region 70 is irradiated with the light from the light emitting element 23. The light intensity distribution in the region overlapping with the region 70 in the light distribution pattern PH of the high beam is, for example, a distribution in which the intensity decreases as the distance from the hot zone HZH increases. In other words, the power supplied to each light emitting element 23 is adjusted by the control unit CO, and the amount of the light emitted from each light emitting element 23 is adjusted so that the intensity of the light in the region 70 has such a distribution. When light is emitted from the second lamp unit 20 and the third lamp unit 30 in this manner, a high beam is emitted from the vehicle headlight 1. In the present embodiment, the light distribution pattern of the light emitted from the vehicle headlight 1 is switched between the light distribution pattern of the high beam and the light distribution pattern corresponding to the other vehicle in response to the detection of the other vehicle by the detection device 110.

Figure 19:
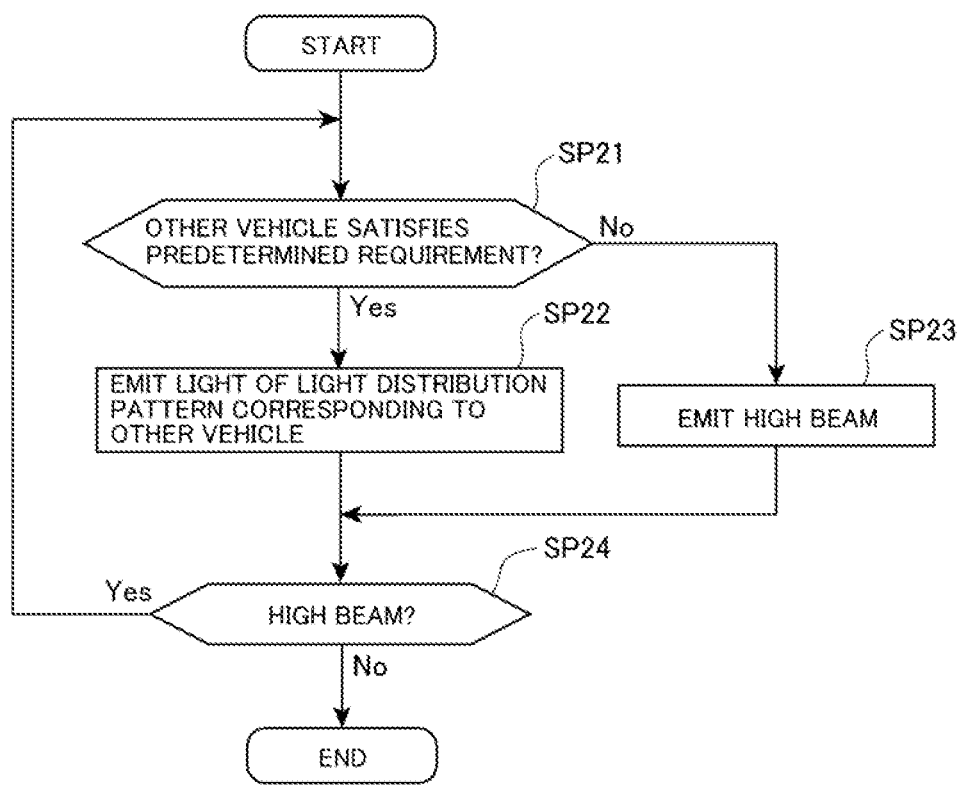
FIG. 19 is a diagram illustrating an example of a control flowchart of a control unit according to the third embodiment.

Next, an operation in which a light distribution pattern of light emitted from the vehicle headlight 1 of the present embodiment is switched between a light distribution pattern of a high beam and a light distribution pattern corresponding to another vehicle will be described. FIG. 19 is a diagram illustrating an example of a control flowchart of the control unit CO according to the present embodiment. As illustrated in FIG. 19, the control flow of the present embodiment includes steps SP21 to SP24.

(Step SP21)

Emission of a high beam is selected by the light switch 120, and a signal indicating emission of a high beam is input from the light switch 120 to the control unit CO. In FIG. 19, this state is a start state. The reference value stored in the memory ME is zero as an initial value.

In this step, the control unit CO determines whether or not another vehicle is detected by the detection device 110 and the other vehicle satisfies a predetermined requirement based on the signal input from the determination unit 50. As described above, when detecting another vehicle, the detection device 110 outputs a signal indicating detection of the other vehicle to the control unit CO via the determination unit 50. When the other vehicle detected by the detection device 110 satisfies the predetermined requirement, the determination unit 50 outputs, to the control unit CO, a signal indicating the distance from the vehicle 100 to the other vehicle and a signal indicating the position of the other vehicle with respect to the vehicle 100 as signals indicating the state of the other vehicle. Therefore, when the signal indicating the detection of the other vehicle and the signal indicating the state of the other vehicle are input from the determination unit 50, the control unit CO determines that the other vehicle satisfies the predetermined requirement, and advances the control flow to step SP22. On the other hand, when the signal indicating the state of the other vehicle is not input from the determination unit 50, the control unit CO determines that the other vehicle does not satisfy the predetermined requirement, and advances the control flow to step SP23. When no other vehicle is detected by the detection device 110, a signal indicating the state of the other vehicle is not input to the determination unit 50, and a signal indicating the detection of the other vehicle is not input to the control unit CO. Therefore, also in such a case, the control flow proceeds to step SP13.

(Step SP22)

In this step, the control unit CO controls the second lamp unit 20 and the third lamp unit 30 so that a light distribution pattern of light emitted from the vehicle headlight 1 becomes a light distribution pattern corresponding to another vehicle detected by the detection device 110. Specifically, the control unit CO refers to the table stored in the memory ME based on a signal indicating the distance from the vehicle 100 to another vehicle and a signal indicating the position of the other vehicle with respect to the vehicle 100. Then, the control unit CO outputs, to the power supply circuit 60, a signal based on the power supplied to each light emitting element 23 in the light distribution pattern according to the information on the state of the other vehicle and the predetermined power supplied to the light emitting element 32a. As a result, the driver of the power supply circuit 60 adjusts the power supplied to each light emitting element 23 so as to generate light of a light distribution pattern corresponding to the information on the state of another vehicle, and supplies predetermined power to the light emitting element 32a. As a result, light having the light distribution pattern is emitted from the vehicle headlight 1. Then, the control unit CO stores the distance from the vehicle 100 to the other vehicle and the information on the position of the other vehicle with respect to the vehicle 100 in the memory ME, rewrites the reference value stored in the memory ME to 1, and advances the control flow to step SP24. Therefore, when the reference value is 1, it can be understood that the vehicle headlight 1 is in a state of emitting light of a light distribution pattern corresponding to another vehicle, and when the reference value is zero, it can be understood that the vehicle headlight 1 is in a state of not emitting light of a light distribution pattern corresponding to another vehicle.

Figure 20:
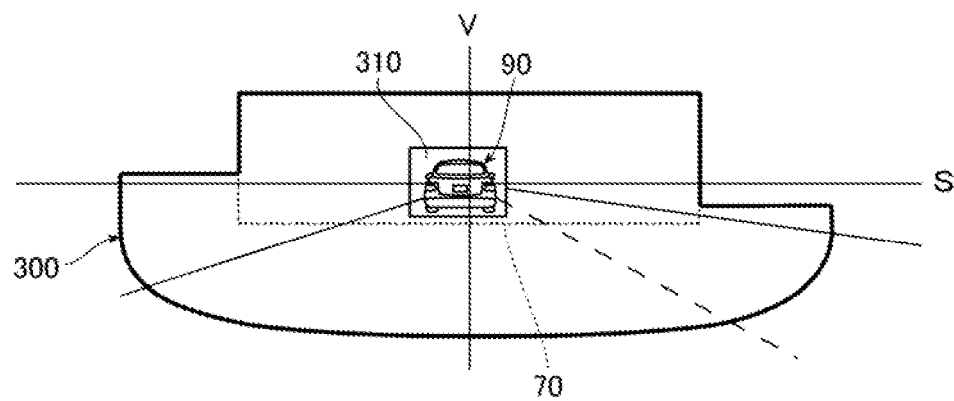
FIG. 20 is a diagram illustrating an example of a light distribution pattern of light emitted when a preceding vehicle is detected as another vehicle by a detection device.

FIG. 20 is a diagram illustrating an example of a light distribution pattern of light emitted when a preceding vehicle is detected as another vehicle by the detection device 110. In FIG. 20, S indicates a horizontal line, V indicates a vertical line passing through the center of the vehicle 100 in the horizontal direction, and a light distribution pattern 300 formed on a virtual vertical screen arranged 25 meters ahead of the vehicle 100 is indicated by a thick line.

In the present embodiment, the shape of the light distribution pattern 300 is the same as the shape of the light distribution pattern PH of the high beam illustrated in FIG. 18. However, the amount of the light from the second lamp unit 20 in a predetermined region 310 of the light distribution pattern 300 is smaller than the amount of the light from the second lamp unit 20 irradiated on the region corresponding to the predetermined region 310 in the high-beam light distribution pattern PH, and the intensity of the light in the predetermined region 310 is lower than a predetermined reference intensity. In the present embodiment, the intensity of light in the predetermined region 310 is substantially constant. Note that the predetermined region 310 may be a region that is not irradiated with light. As described above, in the predetermined region 310, the amount of the light from the second lamp unit 20 is reduced as compared with the case where the determination unit 50 determines that the other vehicle does not satisfy the predetermined requirement. On the other hand, the light intensity distribution in the region other than the predetermined region 310 in the light distribution pattern 300 is substantially the same as the light intensity distribution in the region other than the region corresponding to the predetermined region 310 in the light distribution pattern PH. Therefore, the region other than the predetermined region 310 in the light distribution pattern 300 is a region where the amount of the light from the second lamp unit 20 is not reduced, and is brighter than the predetermined region 310. The light distribution pattern 300 is a light distribution pattern in which the amount of light from the second lamp unit 20 in the predetermined region 310 in the high-beam light distribution pattern PH is reduced.

The predetermined region 310 is located in the region 70 that can be irradiated with the light from the second lamp unit 20, and overlaps with a visual recognition portion for a driver of another vehicle detected by the detection device 110 to visually recognize the outside of the vehicle. The predetermined region 310 preferably overlaps with the entire visual recognition portion of another vehicle. In the example illustrated in FIG. 20, the predetermined region 310 has a rectangular shape including the entire other vehicle 90 detected by the detection device 110, and a side mirror and a rear-view mirror as visual recognition portions are located in the predetermined region 310.

Next, step SP23 indicating the operation of the control unit CO when the other vehicle detected by the detection device 110 does not satisfy the predetermined requirement will be described.

(Step SP23)

In this step, the control unit CO controls the second lamp unit 20 and the third lamp unit 30 so that a high beam is emitted from the vehicle headlight 1. Note that the control of the second lamp unit 20 by the control unit CO differs depending on whether the reference value stored in the memory ME is zero or 1. First, a case where the reference value stored in the memory ME is zero, which is an initial value, will be described.

The control unit CO refers to the reference value stored in the memory ME, and refers to the information on the light distribution pattern of the high beam stored in the memory ME when the reference value is zero. Then, as described above, the control unit CO outputs a signal based on the power supplied to each light emitting element 23 in the light distribution pattern of the high beam and the predetermined power supplied to the light emitting element 32a to the power supply circuit 60. As a result, the driver of the power supply circuit 60 adjusts the power supplied to each light emitting element 23 so as to generate the light having the light distribution pattern PH of the high beam, and the light having the light distribution pattern PH of the high beam is emitted from the vehicle headlight 1. Then, the control unit CO advances the control flow to step SP24.

On the other hand, a case where the reference value is 1 is a case where the vehicle headlight 1 emits light of the light distribution pattern 300 corresponding to another vehicle as described above. Therefore, this is a state in which the vehicle headlight 1 emits light of the light distribution pattern 300 corresponding to the other vehicle even though the other vehicle detected by the detection device 110 does not satisfy the predetermined requirement or the other vehicle is not detected by the detection device 110. Examples of such a state include a case where another vehicle detected by the detection device 110 is not detected. In a case where the other vehicle is a preceding vehicle, for example, when the preceding vehicle and the vehicle 100 are traveling on an uphill, the preceding vehicle exceeds the top of the uphill, and the preceding vehicle is not detected by the detection device 110. In a case where the other vehicle is an oncoming vehicle, for example, there is a case where the oncoming vehicle is hidden behind a building or the like due to the oncoming vehicle entering a parking lot or the like, and the oncoming vehicle is not detected by the detection device 110.

As described above, when the other vehicle satisfies the predetermined requirement, the determination unit 50 stores information indicating the distance from the vehicle 100 to the other vehicle and the position of the other vehicle with respect to the vehicle 100 in the memory ME. Therefore, information indicating the state of the other vehicle immediately before the other vehicle no longer satisfies the predetermined requirement is stored in the memory ME. The control unit CO refers to the reference value stored in the memory ME, and when the reference value is 1, refers to the table stored in the memory ME based on the information indicating the state of the other vehicle stored in the memory ME. Then, the control unit CO outputs, to the power supply circuit 60, a signal based on the power supplied to each light emitting element 23 when the light distribution pattern 300 corresponding to the information indicating the state of the other vehicle is changed to the high-beam light distribution pattern PH. The control unit CO also outputs a signal based on predetermined power supplied to the light emitting element 32a to the power supply circuit 60. As a result, the power supplied to each light emitting element 23 is adjusted by the driver of the power supply circuit 60 so that the light distribution pattern 300 according to the information on another vehicle changes to the light distribution pattern PH of the high beam, and predetermined power is supplied to the light emitting element 32a. As a result, the light distribution pattern 300 corresponding to another vehicle changes to the high-beam light distribution pattern PH, and light that becomes the high-beam light distribution pattern PH is emitted from the vehicle headlight 1. Therefore, it can be understood that the vehicle headlight 1 is switched from the second state to the first state when the state of emitting the light of the light distribution pattern PH of the high beam is the first state and the state of emitting the light of the light distribution pattern 300 corresponding to another vehicle is the second state. Then, the control unit CO rewrites the reference value stored in the memory ME to zero, and advances the control flow to step SP24.

Figure 21:
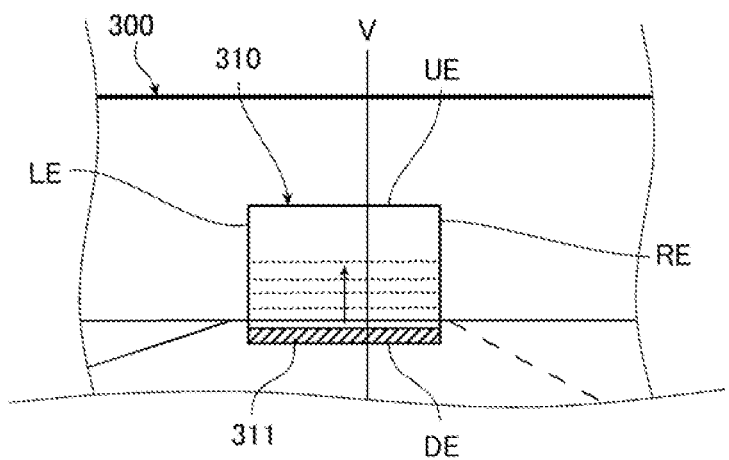
FIG. 21 is a diagram for explaining an example of a state in which a light distribution pattern changes according to another vehicle in the third embodiment.

FIG. 21 is a view for explaining an example of a state in which the light distribution pattern 300 according to another vehicle in the present embodiment changes, and is an enlarged view of a predetermined region 310 and the vicinity thereof in the light distribution pattern 300. Note that the state illustrated in FIG. 21 is a state in which, for example, when the vehicle 100 that emits light having the light distribution pattern 300 illustrated in FIG. 20 and a preceding vehicle are traveling on an uphill, the preceding vehicle exceeds the top of the uphill, and the preceding vehicle is no longer detected by the detection device 110. In the present embodiment, first, the amount of light from the second lamp unit 20 in the predetermined region 310 is increased over time. Then, as illustrated in FIG. 21, the light amount in the region 311 that is a partial region of the predetermined region 310 is returned to the light amount in the region corresponding to the region 311 in the high-beam light distribution pattern PH illustrated in FIG. 18. That is, the region 311 can be understood as a region returned to the light amount in the first state in which the light distribution pattern PH of the high beam is emitted from the vehicle headlight 1. In the present embodiment, the amount of the light from the second lamp unit 20 in the predetermined region 310 is increased over time so that the intensity of the light from the second lamp unit 20 decreases upward from the lower edge DE of the predetermined region 310. In addition, the region 311 returned to the light amount in the first state is a rectangular region extending along the lower edge DE of the predetermined region 310. The region 311 may be in contact with the lower edge DE, and the shape of the region 311 is not particularly limited. Furthermore, in FIG. 21, the region 311 is hatched for easy understanding.

Next, the amount of the light from the second lamp unit 20 is further increased over time in a region other than the region 311 returned to the light amount in the first state in the predetermined region 310 so that the region 311 returned to the light amount in the first state expands upward. In the present embodiment, the amount of the light from the second lamp unit 20 is increased over time such that the intensity of the light from the second lamp unit 20 decreases as the distance from the region 311 increases. For this reason, while a brighter state is maintained in a region close to the region 311 than in a region far from the region 311, both regions become brighter over time. Then, the region 311 is returned to the light amount in the first state in order from the region close to the region 311, and the region 311 expands. Then, the entire predetermined region 310 becomes the region 311 returned to the light amount in the first state, so that the light distribution pattern of the light emitted from the vehicle headlight 1 becomes the high-beam light distribution pattern PH.

Note that the region 311 returned to the light amount in the first state may expand upward from the lower edge DE of the predetermined region 310 over time. For example, when the amount of light from the second lamp unit 20 is increased over time in a region other than the region 311 in the predetermined region 310, the amount of light may increase in the entire region, or the amount of light may increase in a portion of the region.

As described above, in this step, when the vehicle headlight 1 is in the second state, the region 311 returned to the light amount in the first state expands over time, so that the region where the light amount has been reduced becomes smaller over time, and the region where the light amount has been reduced disappears, so that the vehicle headlight 1 is switched from the second state to the first state.

(Step SP24)

In this step, the control unit CO determines whether or not a signal indicating emission of a high beam is input from the light switch 120. When this signal is input to the control unit CO, the control unit CO returns the control flow to step SP21. On the other hand, in a case where this signal is not input to the control unit CO, the control unit CO outputs a predetermined signal to the power supply circuit 60, causes the power supply circuit 60 to stop the supply of power to each light emitting element 23 and the supply of power to the light emitting element 32a, does not emit light from the vehicle headlight 1, and ends this control.

As described above, in the present embodiment, the state of the vehicle headlight 1 is switched between a state of emitting a high beam and a state of emitting light of a light distribution pattern corresponding to another vehicle according to whether another vehicle is in a state of satisfying a predetermined requirement. The control flow of the control unit CO is not limited to the control flow illustrated in FIG. 19.

Meanwhile, Patent Literature 2 described above describes that the state of a vehicle headlight is switched from a first state in which light having a predetermined light distribution pattern is emitted to a second state in which light having a light distribution pattern in which a light shielding region is formed in the predetermined light distribution pattern is emitted, but does not describe that the state is switched from the second state to the first state. For example, in a case where the state is instantaneously switched from the second state to the first state, the entire light shielding region is suddenly irradiated with light, and thus the driver may feel uncomfortable.

Therefore, the vehicle headlight 1 of the present embodiment includes the second lamp unit 20. The second lamp unit 20 includes the plurality of light emitting elements 23 that can individually change the amount of light emitted and are arranged in a matrix, and emits light having a light distribution pattern corresponding to the amount of light emitted from the plurality of light emitting elements 23. In addition, the vehicle headlight 1 of the present embodiment can be switched between a first state in which a high beam that is light of a predetermined light distribution pattern is emitted and a second state in which light of the light distribution pattern 300 in which the light amount of the predetermined region 310 in the light distribution pattern PH of the high beam is reduced is emitted. In the vehicle headlight 1 of the present embodiment, the predetermined region 310 overlaps with a visual recognition portion for a driver of another vehicle to view the outside of the vehicle. Therefore, according to the vehicle headlight 1 of the present embodiment, switching from the first state to the second state can suppress dazzling of an occupant of another vehicle. In addition, in the vehicle headlight 1 of the present embodiment, when the state is switched from the first state to the second state, the amount of light in a partial region 311 of the predetermined region 310 is returned to the amount of light in the region 311 in the first state, and the region 311 expands over time. Therefore, in the vehicle headlight 1 of the present embodiment, the region 311 in the predetermined region 310 becomes bright, and the bright region 311 expands over time. In other words, the region where the amount of the light is reduced becomes smaller over time. Therefore, according to the vehicle headlight 1 of the present embodiment, it is possible to suppress the driver from feeling uncomfortable about the change in brightness in the predetermined region 310 as compared with the case of instantaneously switching from the second state to the first state.

In the vehicle headlight 1 of the present embodiment, the region 311 expands upward from the lower edge DE of the predetermined region 310 over time. The object to which the driver pays attention includes, for example, a pedestrian, an obstacle, and the like on a road as well as other vehicles. In the vehicle headlight 1 of the present embodiment, when switching from the second state to the first state, it can be brightened from the side close to the road in the predetermined region 310. Therefore, according to the vehicle headlight 1 of the present embodiment, for example, when a predetermined region overlaps with a pedestrian, an obstacle, or the like on a road at the time of switching from the second state to the first state, the pedestrian, the obstacle, or the like can be recognized by the driver more quickly.

In the vehicle headlight 1 of the present embodiment, when switching from the second state to the first state, in a region other than the region 311 in the predetermined region 310, the amount of the light is increased over time such that the intensity of the light decreases as the distance from the region 311 increases. As described above, in the vehicle headlight 1 of the present embodiment, when the state is switched from the second state to the first state, the region 311 in the predetermined region 310 becomes bright, and the bright region 311 expands over time. Therefore, with the above configuration, it is possible to make the predetermined region 310 darker with increasing distance from the bright region, and to make the boundary between the bright region and the dark region inconspicuous. Therefore, according to the vehicle headlight 1 of the present embodiment, it is possible to further suppress the driver from feeling uncomfortable about the change in brightness in the predetermined region 310.

In addition, the vehicle headlight 1 of the present embodiment further includes the determination unit 50 that determines whether or not another vehicle is in a state of satisfying a predetermined requirement on the basis of information from the detection device 110. The predetermined requirement is that the distance between the other vehicle and the vehicle 100 is less than the predetermined distance, and the control unit CO controls the second lamp unit 20 as described above when the determination unit 50 determines that the other vehicle satisfies the predetermined requirement. When the distance between the other vehicle and the vehicle 100 increases, dazzling of an occupant of the other vehicle tends to be less likely to occur. Therefore, according to the vehicle headlight 1 of the present embodiment, it is possible to suppress a change in the light distribution pattern PH of the high beam when dazzling of an occupant of another vehicle is unlikely to occur. Note that the control unit CO may control the second lamp unit 20 as described above when a signal indicating detection of another vehicle is input from the detection device 110 regardless of the determination of the determination unit 50, and the vehicle headlight 1 may not include the determination unit 50. In this case, for example, when detecting another vehicle, the detection device 110 directly outputs a signal indicating detection of the other vehicle and a signal indicating the state of the other vehicle to the control unit CO, and stores information indicating the state of the other vehicle in the memory ME.

Fourth Embodiment

Figure 22:
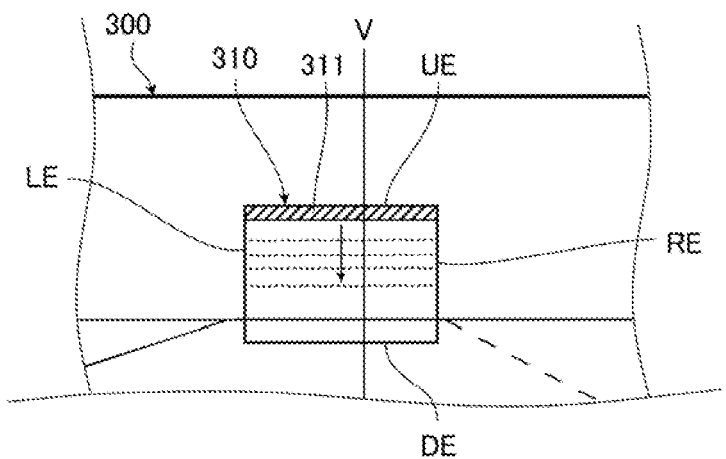
FIG. 22 is a diagram for explaining an example of a state in which a light distribution pattern changes according to another vehicle in a fourth embodiment.

Next, a fourth embodiment as a second aspect of the present invention will be described in detail. Note that the same or equivalent components as those of the third embodiment are denoted by the same reference numerals, and redundant description is omitted unless otherwise specified. The present embodiment is different from the third embodiment in the manner of changing the light amount in the predetermined region 310 when the state is switched from the second state to the first state. FIG. 22 is a view for explaining an example of a state in which the light distribution pattern 200 according to another vehicle in the present embodiment changes, and is an enlarged view of a predetermined region 310 and the vicinity thereof in the light distribution pattern 300.

In the present embodiment, similarly to the third embodiment, the amount of light from the second lamp unit 20 in the predetermined region 310 is increased over time. Then, as illustrated in FIG. 22, the light amount in the region 311 that is a partial region of the predetermined region 310 is returned to the light amount in the region corresponding to the region 311 in the high-beam light distribution pattern PH illustrated in FIG. 18. However, in the present embodiment, the amount of the light from the second lamp unit 20 in the predetermined region 310 is increased over time so that the intensity of the light from the second lamp unit 20 decreases downward from the upper edge UE of the predetermined region 310. In addition, the region 311 returned to the light amount in the first state is a rectangular region extending along the upper edge UE of the predetermined region 310. Note that the region 311 only needs to be in contact with the upper edge UE, and the shape of the region 311 is not particularly limited. Then, the amount of the light from the second lamp unit 20 is further increased over time in a region other than the region 311 returned to the light amount in the first state in the predetermined region 310 such that the region 311 returned to the light amount in the first state expands downward. In the present embodiment, similarly to the third embodiment, the amount of the light from the second lamp unit 20 is increased over time such that the intensity of the light from the second lamp unit 20 decreases as the distance from the region 311 increases. For this reason, while the state in which the region close to the region 311 is brighter than the region far from the region 311 is maintained, both regions become brighter over time. Then, the region 311 is returned to the light amount in the first state in order from the region close to the region 311, and the region 311 expands. Then, the entire predetermined region 310 becomes the region 311 returned to the light amount in the first state, whereby the second state is switched to the first state. In FIG. 22, the region 311 is hatched for easy understanding.

Note that the region 311 returned to the light amount in the first state may expand downward from the upper edge UE of the predetermined region 310 as time passes. For example, when the amount of light from the second lamp unit 20 is increased over time in a region other than the region 311 in the predetermined region 310, the amount of light may increase in the entire region, or the amount of light may increase in a portion of the region.

In the vehicle headlight 1 of the present embodiment, when switching from the second state to the first state, as in the third embodiment, the region 311 in the predetermined region 310 becomes bright, and the bright region 311 expands over time. Therefore, according to the vehicle headlight 1 of the present embodiment, it is possible to suppress the driver from feeling uncomfortable about the change in brightness in the predetermined region 310.

In the present embodiment, when the state is switched from the second state to the first state, the region 311 expands from the upper edge UE of the predetermined region 310 toward the lower side over time, and thus becomes brighter from the upper side of the predetermined region 310. Here, a sign is located above the road. Therefore, according to the vehicle headlight 1 of the present embodiment, for example, when the predetermined region 310 and the sign overlap with each other at the time of switching from the second state to the first state, the sign can be recognized by the driver more quickly.

In the vehicle headlight 1 of the present embodiment, as in the third embodiment, when the state is switched from the second state to the first state, in a region other than the region 311 in the predetermined region 310, the light amount is increased over time such that the intensity of light decreases as the distance from the region 311 increases. Therefore, according to the vehicle headlight 1 of the present embodiment, similarly to the third embodiment, it is possible to further suppress the driver from feeling uncomfortable about the change in brightness in the predetermined region 310.

Fifth Embodiment

Figure 23:
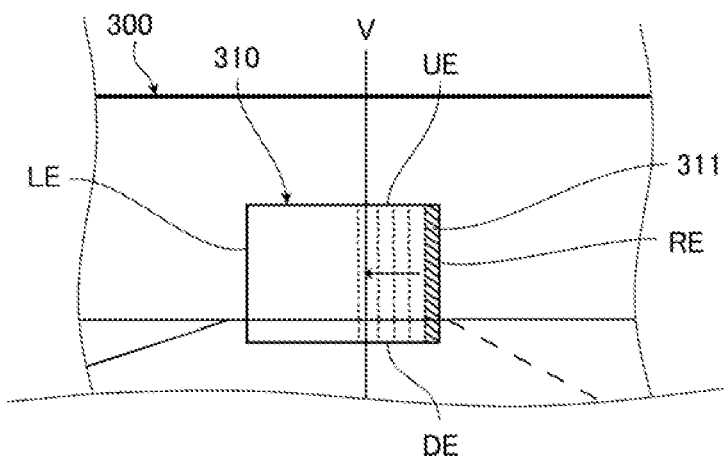
FIG. 23 is a diagram for explaining an example of a state in which a light distribution pattern changes according to another vehicle in a fifth embodiment.

Next, a fifth embodiment as a second aspect of the present invention will be described in detail. Note that the same or equivalent components as those of the third embodiment are denoted by the same reference numerals, and redundant description is omitted unless otherwise specified. The present embodiment is different from the third embodiment in the manner of changing the light amount in the predetermined region 310 when the state is switched from the second state to the first state. FIG. 23 is a view for explaining an example of a state in which the light distribution pattern 300 according to another vehicle in the present embodiment changes, and is an enlarged view of a predetermined region 310 and the vicinity thereof in the light distribution pattern 300.

In the present embodiment, similarly to the third embodiment, the amount of light from the second lamp unit 20 in the predetermined region 310 is increased over time. Then, as illustrated in FIG. 23, the light amount in the region 311 that is a partial region of the predetermined region 310 is returned to the light amount in the region corresponding to the region 311 in the high-beam light distribution pattern PH illustrated in FIG. 18. However, in the present embodiment, the amount of the light from the second lamp unit 20 in the predetermined region 310 is increased over time so that the intensity of the light from the second lamp unit 20 decreases from the right edge RE of the predetermined region 310 toward the left side. In addition, the region 311 returned to the light amount in the first state is a rectangular region extending along the right edge RE of the predetermined region 310. Note that the region 311 may be in contact with the right edge RE, and the shape of the region 311 is not particularly limited. Then, the amount of the light from the first lamp unit 10 is further increased over time in a region other than the region 311 returned to the light amount in the first state in the predetermined region 310 such that the region 311 returned to the light amount in the first state expands to the left side. In the present embodiment, similarly to the third embodiment, the amount of the light from the second lamp unit 20 is increased over time such that the intensity of the light from the second lamp unit 20 decreases as the distance from the region 311 increases. For this reason, while a brighter state is maintained in a region close to the region 311 than in a region far from the region 311, both regions become brighter over time. Then, the region 311 is returned to the light amount in the first state in order from the region close to the region 311, and the region 311 expands. Then, the entire predetermined region 310 becomes the region 311 returned to the light amount in the first state, whereby the second state is switched to the first state. In FIG. 23, the region 311 is hatched for easy understanding.

When the amount of the light from the second lamp unit 20 is increased over time in the region other than the region 311 in the predetermined region 310, the light amount may increase in the entire region, or the light amount may increase in a portion of the region.

In the vehicle headlight 1 of the present embodiment, when switching from the second state to the first state, as in the third embodiment, the region 311 in the predetermined region 310 becomes brighter, and the brightened region 311 expands over time. Therefore, according to the vehicle headlight 1 of the present embodiment, it is possible to suppress the driver from feeling uncomfortable about the change in brightness in the predetermined region 310.

In the vehicle headlight 1 of the present embodiment, as in the third embodiment, when switching from the second state to the first state, in a region other than the region 311 in the predetermined region 310, the amount of the light is increased over time so that the intensity of the light decreases as the distance from the region 311 increases. Therefore, according to the vehicle headlight 1 of the present embodiment, similarly to the third embodiment, it is possible to further suppress the driver from feeling uncomfortable about the change in brightness in the predetermined region 310.

In the vehicle headlight 1 of the present embodiment, when switching from the second state to the first state, the region 311 expands from the right edge RE of the predetermined region 310 toward the left side over time, and thus, becomes bright from the right side of the predetermined region 310. Therefore, the adjustment of the light emitted from the plurality of light emitting elements 23 can be simplified and the control of the plurality of light emitting elements 23 by the control unit CO can be simplified as compared with the case where the light is brighter from both sides in the horizontal direction of the predetermined region 310. From the viewpoint of simplifying the control of the plurality of light emitting elements 23, when the state is switched from the second state to the first state, the region 311 may expand from the edge on one side in the horizontal direction of the predetermined region 310 toward the other side over time. For example, the region 311 may expand from the left edge LE of the predetermined region 310 toward the right side over time. Further, as described above, in the configuration in which the region 311 expands from the edge on one side in the horizontal direction of the predetermined region 310 toward the other side over time, when the predetermined region 310 and the sign located on the shoulder side overlap with each other and the region 311 expands from the edge on the side where the sign is located in the horizontal direction, the driver can recognize the sign quickly.

In the present embodiment, the center of the predetermined region 310 in the horizontal direction is located on the left side of the vertical line V. As described above, since the center of the light distribution pattern PH of the high beam in the horizontal direction is located on or near the vertical line V, the center of the predetermined region 310 in the horizontal direction is shifted to the left from the center of the light distribution pattern PH of the high beam in the horizontal direction. Then, when the state is switched from the second state to the first state, the region 311 expands leftward from the right edge RE in the predetermined region 310. Note that, although illustration is omitted, in the vehicle headlight 1 of the present embodiment, in a case where the center in the horizontal direction of the predetermined region 310 is shifted to the right from the center in the horizontal direction of the light distribution pattern PH of the high beam, when the state is switched from the second state to the first state, the region 311 expands from the left edge LE to the right in the predetermined region 310. Therefore, it can be understood that the center of the predetermined region 310 is shifted to a predetermined side in the horizontal direction from the center in the horizontal direction of the light distribution pattern PH of the high beam, and the region 311 expands from the edge on the opposite side to the predetermined side in the horizontal direction of the predetermined region 310 toward the predetermined side over time. In the vehicle headlight 1 of the present embodiment having such a configuration, when the state is switched from the second state to the first state, it can be brightened from the side close to the vertical line V passing through the center of the vehicle 100 among both sides in the horizontal direction of the predetermined region 310. Therefore, according to the vehicle headlight 1 of the present embodiment, it is possible to further suppress the driver from feeling uncomfortable about the change in brightness in the predetermined region 310 as compared with the case where the brightness is brighter from the side farther from the vertical line V passing through the center of the vehicle 100 among both sides in the horizontal direction of the predetermined region 310.

Sixth Embodiment

Figure 24:
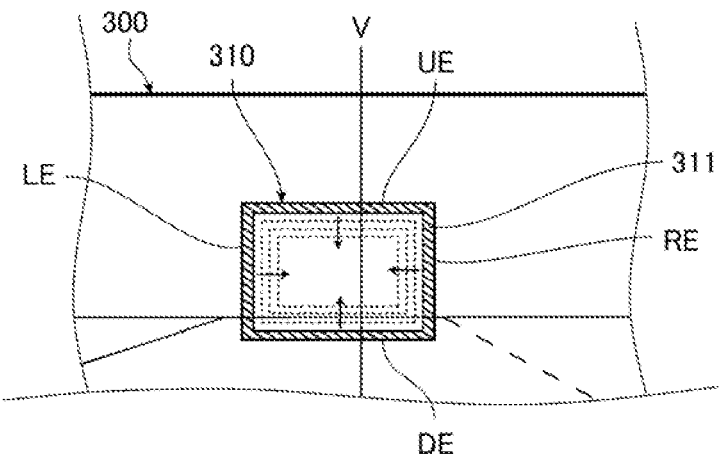
FIG. 24 is a diagram for explaining an example of a state in which a light distribution pattern changes according to another vehicle in a sixth embodiment.

Next, a sixth embodiment as a second aspect of the present invention will be described in detail. Note that the same or equivalent components as those of the third embodiment are denoted by the same reference numerals, and redundant description is omitted unless otherwise specified. The present embodiment is different from the third embodiment in the manner of changing the light amount in the predetermined region 310 when the state is switched from the second state to the first state. FIG. 24 is a view for explaining an example of a state in which the light distribution pattern 300 according to another vehicle in the present embodiment changes, and is an enlarged view of a predetermined region 310 and the vicinity thereof in the light distribution pattern 300.

In the present embodiment, similarly to the third embodiment, the amount of light from the second lamp unit 20 in the predetermined region 310 is increased over time. Then, as illustrated in FIG. 24, the light amount in the region 311 that is a partial region of the predetermined region 310 is returned to the light amount in the region corresponding to the region 311 in the high-beam light distribution pattern PH illustrated in FIG. 18. However, in the present embodiment, the amount of the light from the second lamp unit 20 in the predetermined region 310 is increased over time so that the intensity of the light from the second lamp unit 20 decreases from the entire circumference of the outer peripheral edge including the upper, lower, left, and right edges UE, DE, LE, and RE of the predetermined region 310 toward the inside of the predetermined region 310. The region 311 returned to the light amount in the first state is an annular region extending along the entire circumference of the outer peripheral edge of the predetermined region 310. Note that the region 311 may be in contact with the entire circumference of the outer peripheral edge of the predetermined region 310, and the shape of the region 311 is not particularly limited. Then, the amount of the light from the second lamp unit 20 is further increased over time in a region other than the region 311 returned to the light amount in the first state in the predetermined region 310 such that the region 311 returned to the light amount in the first state expands toward the inside of the predetermined region 310. In the present embodiment, similarly to the third embodiment, the amount of the light from the second lamp unit 20 is increased over time such that the intensity of the light from the second lamp unit 20 decreases as the distance from the region 311 increases. For this reason, while the state in which the region close to the region 311 is brighter than the region far from the region 311 is maintained, both regions become brighter over time.

Then, the region 311 is returned to the light amount in the first state in order from the region close to the region 311, and the region 311 expands. Then, the entire predetermined region 310 becomes the region 311 returned to the light amount in the first state, whereby the second state is switched to the first state. In FIG. 24, the region 311 is hatched for easy understanding.

In the vehicle headlight 1 of the present embodiment, when switching from the second state to the first state, in the region 311, the predetermined region 310 expands from the entire circumference of the outer peripheral edge toward the inner side of the predetermined region 310 over time. Therefore, as compared with the case where the region 311 expands from a portion of the outer peripheral edge of the predetermined region 310, the predetermined region 310 can be brightened quickly. Therefore, a sign or the like overlapping with the predetermined region 310 can be recognized by the driver more quickly. In addition, as compared with a case where the region 311 extends from a portion of the outer peripheral edge of the predetermined region 310, it is possible to suppress the driver from feeling uncomfortable and to give the driver a sense of security. Note that the region 311 returned to the light amount in the first state may expand from the entire circumference of the outer peripheral edge of the predetermined region 310 toward the inner side of the predetermined region 310 over time. For example, when the amount of light from the second lamp unit 20 is increased over time in a region other than the region 311 in the predetermined region 310, the amount of light may increase in the entire region, or the amount of light may increase in a portion of the region.

In the vehicle headlight 1 of the present embodiment, when switching from the second state to the first state, as in the third embodiment, the region 311 in the predetermined region 310 becomes brighter, and the brightened region 311 expands over time. Therefore, according to the vehicle headlight 1 of the present embodiment, it is possible to suppress the driver from feeling uncomfortable about the change in brightness in the predetermined region 310.

In the vehicle headlight 1 of the present embodiment, as in the third embodiment, when the state is switched from the second state to the first state, in a region other than the region 311 in the predetermined region 310, the light amount is increased over time such that the intensity of light decreases as the distance from the region 311 increases. Therefore, according to the vehicle headlight 1 of the present embodiment, similarly to the third embodiment, it is possible to further suppress the driver from feeling uncomfortable about the change in brightness in the predetermined region 310.

Note that how the region 311 expands is not particularly limited. For example, the region 311 may expand from the left and right edges LE and RE of the predetermined region 310 toward the inside of the predetermined region 310, or may expand from the upper and lower edges UE and DE of the predetermined region 310 toward the inside of the predetermined region 310. Even if the region 311 expands in this manner, it is possible to suppress the driver from feeling uncomfortable about the change in brightness of the predetermined region 310 as in the third embodiment.

Seventh Embodiment

Next, a seventh embodiment as a second aspect of the present invention will be described in detail. Note that the same or equivalent components as those of the third embodiment are denoted by the same reference numerals, and redundant description is omitted unless otherwise specified.

Figure 25:
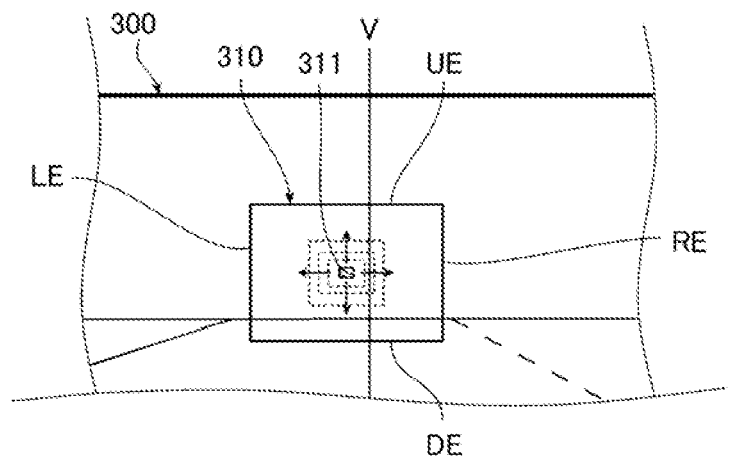
FIG. 25 is a diagram for explaining an example of a state in which a light distribution pattern changes according to another vehicle in a seventh embodiment.

The present embodiment is different from the third embodiment in the manner of changing the light amount in the predetermined region 310 when the state is switched from the second state to the first state. FIG. 25 is a view for explaining an example of a state in which the light distribution pattern 300 according to another vehicle in the present embodiment changes, and is an enlarged view of a predetermined region 310 and the vicinity thereof in the light distribution pattern 300.

In the present embodiment, similarly to the third embodiment, the amount of light from the second lamp unit 20 in the predetermined region 310 is increased over time. Then, as illustrated in FIG. 25, the light amount in the region 311 that is a partial region of the predetermined region 310 is returned to the light amount in the region corresponding to the region 311 in the high-beam light distribution pattern PH illustrated in FIG. 18. However, in the present embodiment, the amount of the light from the second lamp unit 20 in the predetermined region 310 is increased over time such that the intensity of the light from the second lamp unit 20 decreases from the inner side of the predetermined region 310 toward the outer peripheral side of the predetermined region 310. In addition, the region 311 returned to the light amount in the first state is a rectangular region located inside the outer peripheral edge of the predetermined region 310 and overlapping with the center of the predetermined region 310. Note that the region 311 only needs to be separated from the outer peripheral edge of the predetermined region 310, and the shape and position of the region 311 are not particularly limited. Then, the amount of the light from the second lamp unit 20 is further increased over time in a region other than the region 311 returned to the light amount in the first state in the predetermined region 310 such that the region 311 returned to the light amount in the first state expands toward the outer peripheral side of the predetermined region 310. In the present embodiment, similarly to the third embodiment, the amount of the light from the second lamp unit 20 is increased over time such that the intensity of the light from the second lamp unit 20 decreases as the distance from the region 311 increases. For this reason, while the state in which the region close to the region 311 is brighter than the region far from the region 311 is maintained, both regions become brighter over time. Then, the region 311 is returned to the light amount in the first state in order from the region close to the region 311, and the region 311 expands. Then, the entire predetermined region 310 becomes the region 311 returned to the light amount in the first state, whereby the second state is switched to the first state. In FIG. 25, the region 311 is hatched for easy understanding.

Note that the region 311 returned to the light amount in the first state may expand from the inner side of the predetermined region 310 toward the outer side of the predetermined region 310 over time. For example, when the amount of light from the second lamp unit 20 is increased over time in a region other than the region 311 in the predetermined region 310, the amount of light may increase in the entire region, or the amount of light may increase in a portion of the region.

In the vehicle headlight 1 of the present embodiment, when switching from the second state to the first state, as in the third embodiment, the region 311 in the predetermined region 310 becomes brighter, and the brightened region 311 expands over time. Therefore, according to the vehicle headlight 1 of the present embodiment, it is possible to suppress the driver from feeling uncomfortable about the change in brightness in the predetermined region 310.

In the vehicle headlight 1 of the present embodiment, as in the third embodiment, when the state is switched from the second state to the first state, in a region other than the region 311 in the predetermined region 310, the light amount is increased over time such that the intensity of light decreases as the distance from the region 311 increases. Therefore, according to the vehicle headlight 1 of the present embodiment, similarly to the third embodiment, it is possible to further suppress the driver from feeling uncomfortable about the change in brightness in the predetermined region 310.

In the present embodiment, the speed at which the region 311 expands downward is substantially the same as the speed at which the region 311 expands upward, but may be faster than the speed at which the region 311 expands upward. With such a configuration, when the state is switched from the second state to the first state, the lower side in the predetermined region 310 can be brighter than the upper side. Therefore, according to such a vehicle headlight, for example, when the predetermined region 310 overlaps with a pedestrian, an obstacle, or the like on the road at the time of switching from the second state to the first state, the pedestrian, the obstacle, or the like can be recognized by the driver more quickly.

Alternatively, the speed at which the region 311 expands upward may be faster than the speed at which the region 311 expands downward. With such a configuration, when the state is switched from the second state to the first state, the upper side in the predetermined region 310 can be brighter than the lower side. Therefore, according to such a vehicle headlight, for example, when the predetermined region 310 and the sign overlap with each other at the time of switching from the second state to the first state, the driver can recognize the sign more quickly.

In the present embodiment, the entire outer peripheral edge of the predetermined region 310 simultaneously coincides with the outer peripheral edge of the predetermined region 310. However, the upper side of the outer peripheral edge of the region 311 may coincide with the outer peripheral edge of the predetermined region 310 before the lower side. Alternatively, the lower side of the outer peripheral edge of the region 311 may coincide with the outer peripheral edge of the predetermined region 310 before the upper side.

Although the second aspect of the present invention has been described by taking the third to seventh embodiments as an example, the second aspect of the present invention is not limited thereto.

For example, also in the second aspect, the second lamp unit 20 may have a configuration as illustrated in FIG. 16 described above.

In the third to seventh embodiments, the vehicle headlight 1 including the third lamp unit 30 has been described as an example. However, the vehicle headlight 1 may not include the third lamp unit 30. In this case, for example, the region 70 that can be irradiated with the light emitted from the second lamp unit 20 is expanded by increasing the number of the light emitting elements 23, and the light distribution pattern of the high beam, the light distribution pattern of the low beam, and the light distribution pattern corresponding to another vehicle are formed by the light from the second lamp unit 20. The configuration of the third lamp unit 30 is not particularly limited. The third lamp unit 30 may be, for example, a parabolic lamp.

In the third to seventh embodiments, the lamp units 20 and 30 each including the housings 26 and 36 have been described as an example. However, these lamp units 20 and 30 may share one housing, and members other than the housing of each of the lamp units 20 and 30 may be accommodated in the lamp chamber in one housing.

In the third to seventh embodiments, the predetermined region 310 not connected to the outer edge of the light distribution pattern 300 has been described as an example. However, the predetermined region 310 may be connected to the outer edge of the light distribution pattern 300. Furthermore, the intensity of light in the predetermined region 310 may change according to, for example, a distance from the vehicle 100 to another vehicle. Furthermore, the width of the predetermined region 310 in the horizontal direction may change according to the distance from the vehicle 100 to another vehicle, for example.

In the third to seventh embodiments, the vehicle headlight 1 capable of switching between the first state in which the light of the high-beam light distribution pattern PH is emitted and the second state in which the light of the light distribution pattern 200 in which the light amount of the predetermined region 310 in the high-beam light distribution pattern PH is reduced is emitted has been described as an example. However, the vehicle headlight 1 only needs to be switchable between a first state in which light of a predetermined light distribution pattern is emitted and a second state in which light of a light distribution pattern in which the light amount of a predetermined region in the predetermined light distribution pattern is reduced is emitted.

In the third to seventh embodiments, the case where the preceding vehicle as another vehicle is detected by the detection device 110 has been described as an example. However, the third to seventh embodiments can also be applied to a case where an oncoming vehicle as another vehicle is detected by the detection device 110.

In the third to seventh embodiments, the control unit CO controls the power supplied to each light emitting element 23 with reference to the table stored in the memory ME. However, the control unit CO may calculate information on the power supplied to each light emitting element 23 on the basis of the information input from the determination unit 50, and control the power supplied to each light emitting element 23 on the basis of this information.

According to a first aspect of the present invention, there is provided a vehicle headlight capable of improving forward visibility of a vehicle while suppressing dazzling of an occupant of another vehicle, and according to a second aspect of the present invention, there is provided a vehicle headlight capable of suppressing a driver from feeling uncomfortable, and the vehicle headlight can be used in the field of vehicle headlights such as automobiles.

The invention claimed is:

1. A vehicle headlight comprising:
   a first lamp unit including a plurality of first light emitting units capable of individually changing an amount of light emitted, the first lamp unit emitting light from the plurality of first light emitting units such that first irradiation spots irradiated with the light from the respective first light emitting units are arranged at least in a horizontal direction;
   a second lamp unit including a plurality of second light emitting units capable of individually changing an amount of light emitted, the second lamp unit emitting light from the plurality of second light emitting units such that second irradiation spots irradiated with the light from the respective second light emitting units are arranged in a matrix;
   a region determination unit that determines, based on a signal indicating a state of another vehicle from a detection device that detects the other vehicle located in front of the vehicle, a predetermined region overlapping with a visual recognition portion for allowing a driver of the other vehicle to visually recognize the outside of the vehicle; and a control unit, wherein the second irradiation spots are smaller than the first irradiation spots, and at least one of the first irradiation spots overlaps with at least one of the second irradiation spots, when the predetermined region is not determined by the region determination unit, the control unit controls the first lamp unit such that at least light is emitted from the first lamp unit, and when the predetermined region is determined by the region determination unit, the control unit controls the first lamp unit such that an amount of light emitted from the first light emitting unit corresponding to the first irradiation spot overlapping with the predetermined region is reduced, and controls the second lamp unit such that an amount of light emitted from the second light emitting unit corresponding to the second irradiation spot overlapping with the predetermined region is reduced or becomes zero, and light is emitted from the second light emitting unit corresponding to the second irradiation spot overlapping with the first irradiation spot overlapping with the predetermined region and not overlapping with the predetermined region.

2. The vehicle headlight according to claim 1, wherein when the predetermined region is determined by the region determination unit, the control unit controls the second lamp unit so that the amount of light emitted from the second light emitting unit corresponding to the second irradiation spot overlapping with the first irradiation spot overlapping with the predetermined region and not overlapping with the predetermined region increases as compared with a case where the predetermined region is not determined by the region determination unit.

3. The vehicle headlight according to claim 1, wherein at least one of the first irradiation spots overlaps with at least two of the second irradiation spots, and when the predetermined region is determined by the region determination unit, the control unit controls the second lamp unit such that the second light emitting unit corresponding to the second irradiation spot closer to the predetermined region among the second irradiation spots overlapping with the first irradiation spot overlapping with the predetermined region and not overlapping with the predetermined region emits a larger amount of light.

4. The vehicle headlight according to claim 1, wherein when the predetermined region is determined by the region determination unit, the control unit controls the second lamp unit such that the amount of light emitted from the second light emitting unit corresponding to the second irradiation spot overlapping with the first irradiation spot overlapping with the predetermined region and not overlapping with the predetermined region does not change from the amount of light when the predetermined region is not determined by the region determination unit.

5. The vehicle headlight according to claim 1, wherein when the predetermined region is not determined by the region determination unit, the control unit controls the first lamp unit and the second lamp unit so that light is emitted from the first lamp unit and the second lamp unit.

6. A vehicle headlight comprising:

a lamp unit including a plurality of light emitting units capable of individually changing an amount of light emitted and arranged in a matrix, the lamp unit emitting light having a light distribution pattern corresponding to the amount of light emitted from the plurality of light emitting units, wherein the lamp unit can be switched between a first state in which light of a predetermined light distribution pattern is emitted and a second state in which light of a light distribution pattern in which a light amount of a predetermined region in the predetermined light distribution pattern is reduced is emitted, when the state is switched from the second state to the first state, the light amount in a partial region of the predetermined region is returned to the light amount in the partial region in the first state, and the partial region expands over time, and the partial region expands upward from a lower edge of the predetermined region over time.

7. A vehicle headlight comprising:

a lamp unit including a plurality of light emitting units capable of individually changing an amount of light emitted and arranged in a matrix, the lamp unit emitting light having a light distribution pattern corresponding to the amount of light emitted from the plurality of light emitting units, wherein the lamp unit can be switched between a first state in which light of a predetermined light distribution pattern is emitted and a second state in which light of a light distribution pattern in which a light amount of a predetermined region in the predetermined light distribution pattern is reduced is emitted, when the state is switched from the second state to the first state, the light amount in a partial region of the predetermined region is returned to the light amount in the partial region in the first state, and the partial region expands over time; and the partial region expands downward from an upper edge of the predetermined region over time.

8. A vehicle headlight comprising:

a lamp unit including a plurality of light emitting units capable of individually changing an amount of light emitted and arranged in a matrix, the lamp unit emitting light having a light distribution pattern corresponding to the amount of light emitted from the plurality of light emitting units, wherein the lamp unit can be switched between a first state in which light of a predetermined light distribution pattern is emitted and a second state in which light of a light distribution pattern in which a light amount of a predetermined region in the predetermined light distribution pattern is reduced is emitted, when the state is switched from the second state to the first state, the light amount in a partial region of the predetermined region is returned to the light amount in the partial region in the first state, and the partial region expands over time, and the partial region expands from an edge on one side in a horizontal direction of the predetermined region toward the other side over time.

9. The vehicle headlight according to claim 8, wherein a center of the predetermined region is shifted from a center of the predetermined light distribution pattern in the horizontal direction to a predetermined side in the horizontal direction, and the partial region expands from an edge on a side opposite to the predetermined side in the horizontal direction of the predetermined region toward the predetermined side over time.

10. A vehicle headlight comprising:

a lamp unit including a plurality of light emitting units capable of individually changing an amount of light emitted and arranged in a matrix, the lamp unit emitting light having a light distribution pattern corresponding to the amount of light emitted from the plurality of light emitting units, wherein the lamp unit can be switched between a first state in which light of a predetermined light distribution pattern is emitted and a second state in which light of a light distribution pattern in which a light amount of a predetermined region in the predetermined light distribution pattern is reduced is emitted, when the state is switched from the second state to the first state, the light amount in a partial region of the predetermined region is returned to the light amount in the partial region in the first state, and the partial region expands over time, and the partial region expands from an entire circumference of an outer peripheral edge of the predetermined region toward an inner side of the predetermined region over time.

11. A vehicle headlight comprising:

a lamp unit including a plurality of light emitting units capable of individually changing an amount of light emitted and arranged in a matrix, the lamp unit emitting light having a light distribution pattern corresponding to the amount of light emitted from the plurality of light emitting units, wherein the lamp unit can be switched between a first state in which light of a predetermined light distribution pattern is emitted and a second state in which light of a light distribution pattern in which a light amount of a predetermined region in the predetermined light distribution pattern is reduced is emitted, when the state is switched from the second state to the first state, the light amount in a partial region of the predetermined region is returned to the light amount in the partial region in the first state, and the partial region expands over time, and the partial region expands from an inner side of the predetermined region toward an outer peripheral side of the predetermined region over time.

12. The vehicle headlight according to claim 11, wherein a speed at which the partial region expands downward is faster than a speed at which the partial region expands upward.

13. The vehicle headlight according to claim 11, wherein a speed at which the partial region expands upward is faster than a speed at which the partial region expands downward.

14. A vehicle headlight comprising:

a lamp unit including a plurality of light emitting units capable of individually changing an amount of light emitted and arranged in a matrix, the lamp unit emitting light having a light distribution pattern corresponding to the amount of light emitted from the plurality of light emitting units, wherein the lamp unit can be switched between a first state in which light of a predetermined light distribution pattern is emitted and a second state in which light of a light distribution pattern in which a light amount of a predetermined region in the predetermined light distribution pattern is reduced is emitted, when the state is switched from the second state to the first state, the light amount in a partial region of the predetermined region is returned to the light amount in the partial region in the first state, and the partial region expands over time, and when the state is switched from the second state to the first state, in a region other than the partial region in the predetermined region, a light amount is increased over time such that an intensity of light decreases as a distance from the partial region increases.

\* \* \* \* \*